United States Patent [19]
Scott et al.

[11] Patent Number: 6,003,923
[45] Date of Patent: Dec. 21, 1999

[54] FULL LENGTH SIDE STORAGE CONTAINERS FOR PICKUP BEDS

[75] Inventors: Gary M. Scott, Milwaukie, Oreg.; Scott Cover, Fullerton, Calif.

[73] Assignee: Warn Industries, Inc., Milwaukie, Oreg.

[21] Appl. No.: 08/958,604

[22] Filed: Oct. 27, 1997

Related U.S. Application Data

[60] Provisional application No. 60/029,827, Oct. 28, 1996.

[51] Int. Cl.$^6$ ..................................................... B60R 11/06
[52] U.S. Cl. ............................................................ 296/37.6
[58] Field of Search ............................................. 296/37.6

[56] References Cited

U.S. PATENT DOCUMENTS

| | | |
|---|---|---|
| 1,412,680 | 4/1922 | Fuller . |
| 3,326,595 | 6/1967 | Ogilvie .................... 296/37.6 |
| 3,664,704 | 5/1972 | Ellis . |
| 3,727,971 | 4/1973 | Sisler . |
| 4,135,761 | 1/1979 | Ward ........................ 296/37.6 |
| 4,705,317 | 11/1987 | Henri . |
| 4,789,195 | 12/1988 | Fletcher . |
| 4,946,215 | 8/1990 | Taylor . |
| 5,267,773 | 12/1993 | Kalis et al. .............. 296/39.6 |
| 5,535,931 | 7/1996 | Barlow et al. .......... 296/37.6 |
| 5,567,000 | 10/1996 | Clare ....................... 296/37.6 |
| 5,615,922 | 4/1997 | Blanchard ............... 296/37.6 |

*Primary Examiner*—Gary C. Hoge
*Attorney, Agent, or Firm*—Loeb & Loeb LLP; F. Jason Fas-hadian

[57] ABSTRACT

A storage space for pickup trucks many times larger and more conveniently accessible than those previously available. This is accomplished by using all the space from the outside of the truck bed to the inside of the wheel wells using the inside surface formed by the storage container. The angled top and rounded rear surfaces of the storage container inner surfaces integrate naturally with the pickup bed interior so that there is virtually no perceived reduction of the main cargo area. The storage container is characterized as having: 1. Openings at the top of the enclosure that are at a specific angle so they allow full access to the interior of the enclosure including that covered by the bed rail; 2. Lids for the top of the enclosure made to wrap around the back of the enclosure for the loading of long items and improved access from the end of the bed; 3. A retention system for the top of the containers that requires only upwardly extending surfaces that lock the top in place when rotated into position from the side; 4. A four lid-version where the two front lids are identical and can be made from the same tooling, and the back wrap around lids are mirror images; 5. A storage container combining angled top and angled or rounded rear surfaces to create an aesthetically pleasing shape that integrates naturally with the pickup bed interior. This results in adding enclosed storage with virtually no perceived reduction of the main cargo area.

35 Claims, 24 Drawing Sheets

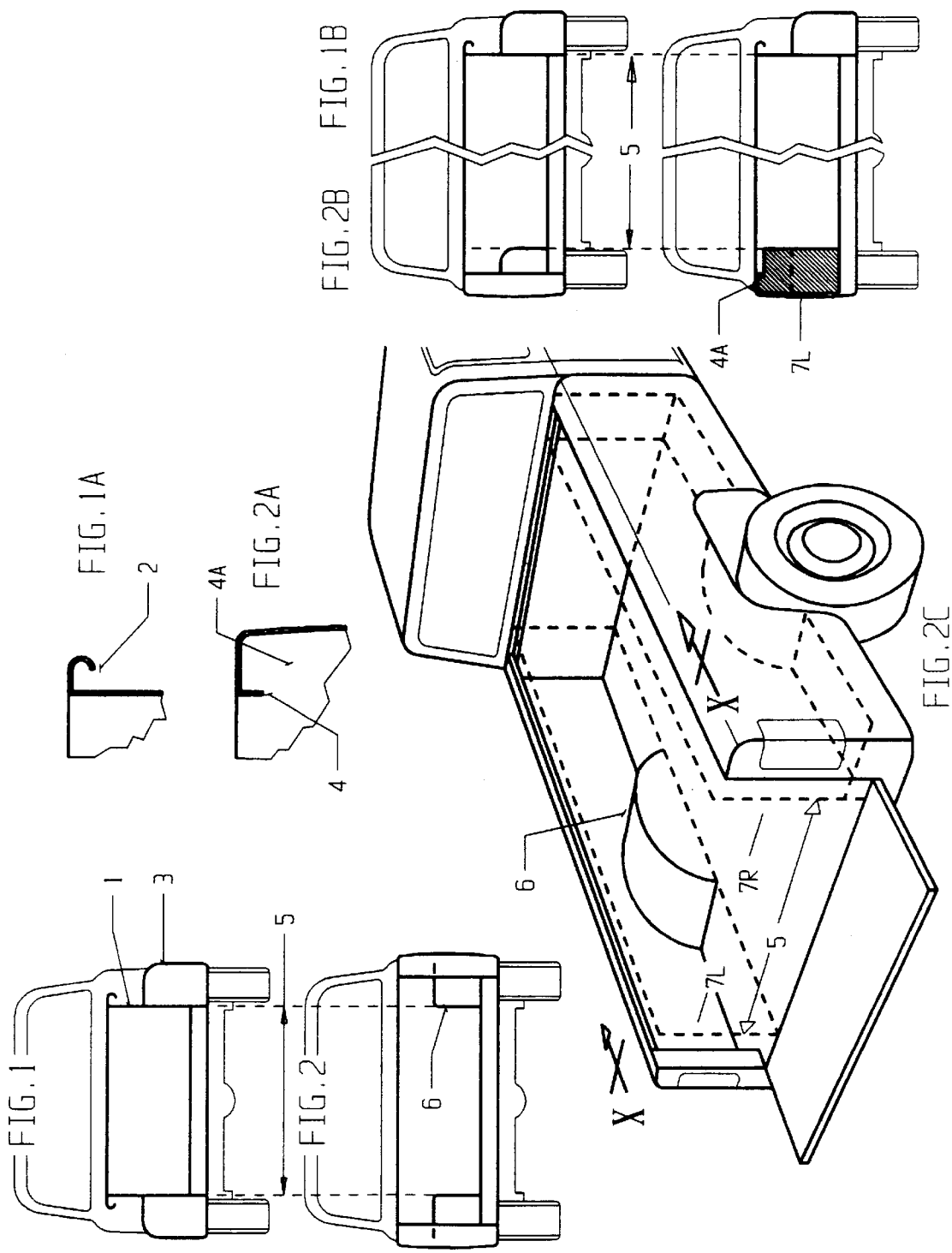

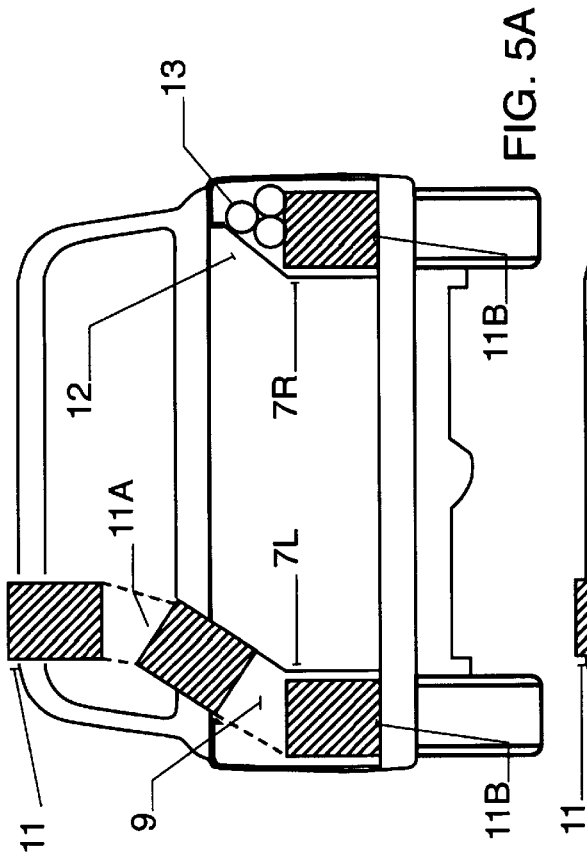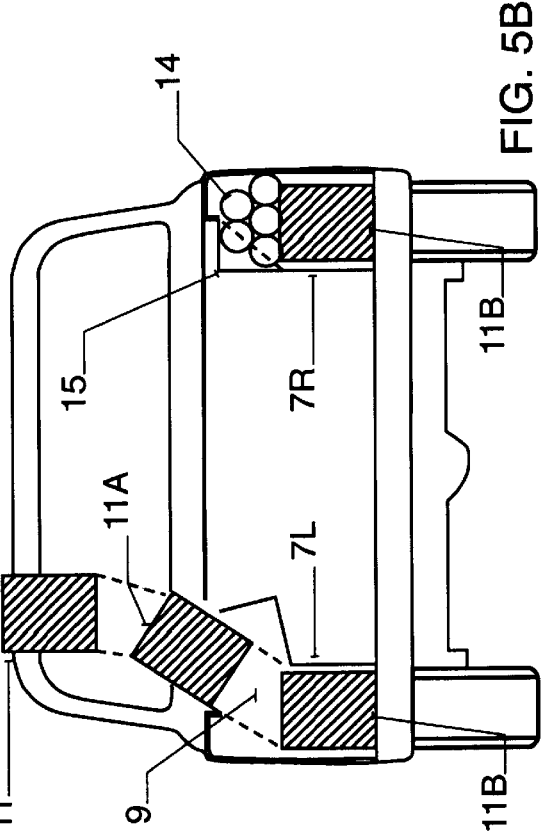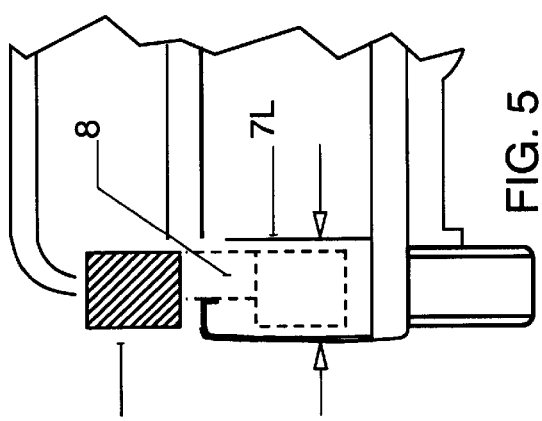

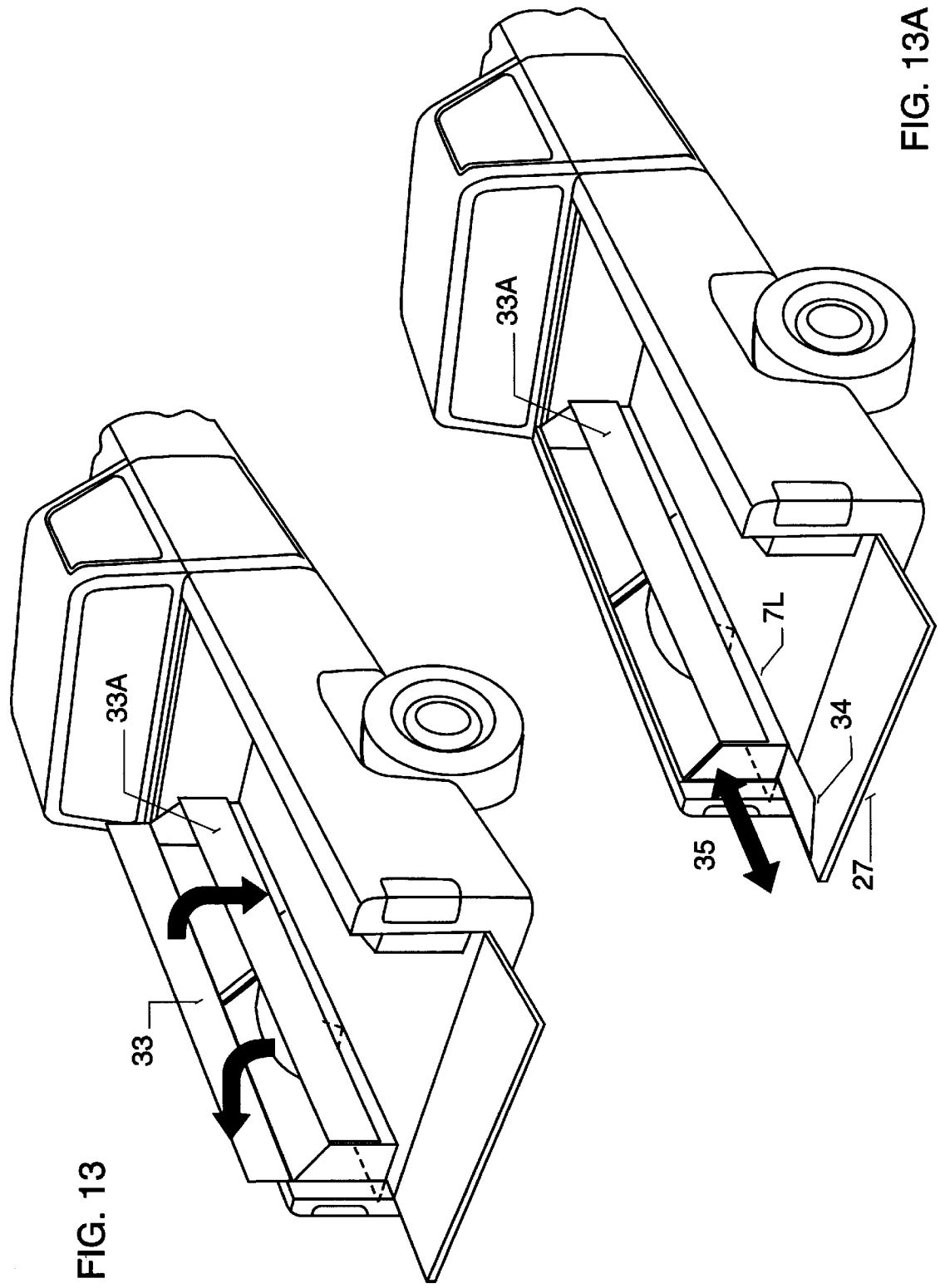

FULL LENGTH SIDE STORAGE CONTAINERS FOR PICKUP BEDS

RELATED APPLICATIONS

This application claims priority to U.S. provisional application Ser. No. 60/029,827 filed on Oct. 28, 1996.

BACKGROUND OF THE INVENTION

1. Field of the Invention

This invention relates to specialized containers for secure storage of items that could not safely or conveniently be left in an open pickup bed. These specialized containers are specifically designed to not intrude into the primary cargo area of the pickup bed and to only occupy the space that is typically not useful for hauling cargo.

2. Background of the Invention

Until the nineteen fifties, the load space in a standard pickup truck bed was a rectangular box shape with flat sides, front, back, and bottom. The rear tires were outside of the bed and covered with fenders that were separate from the pickup cab. For the last four or five decades the pickup bed primary cargo area has been approximately four feet wide, eighteen inches deep, and eight feet long on long box models. Short box models are usually six and one half feet long, and with the tailgate opened in the horizontal position, they also held loads up to eight feet long. The four foot wide by eight foot long load space was adopted as the standard pickup bed size because four by eight feet is the standard size of plywood, drywall, and other building materials. These standard dimensions have caused many other items to be sized to fit in this space including garden tractors, all terrain vehicles, and the like. The top edges of the standard pickup bed were turned outward to form a flange called a bed rail to both strengthen them and provide a flat area to attach a canopy or tonneau cover, or to install stakes to increase side wall height for tall loads.

Pickups were originally designed and used as work vehicles. By the fifties, pickups became increasingly popular as second vehicles as they became used for recreation as well as work. As their uses broadened, owners began wanting their pickups to be more versatile and have more comfort and style. In the mid-fifties the first pickups with a full width bed were produced. In this design the side walls of the bed were moved outward to the full width of the pickup aligning with the sides of the pickup cab and extending continuously from the cab to the tailgate. The pickup bed ceased to be a simple box shape as parts of the interior extended out over the tires about one foot per side for a total width averaging approximately six feet at the widest point.

The fenders were now inside the pickup box and were called wheel wells. The pickup bed rails used to strengthen the tops of the box side walls and mount stakes, canopies, tonneau covers and the like, were now turned inward over the tops of the wheel wells. The four foot wide by eight foot long primary cargo area remained the same as on previous pickup box designs. The four foot width was now defined and limited by the insides of the wheel wells instead of the flat bed side walls on previous models.

The increased space inside the box that was as much as a foot per side was limited to the nooks and crannies on each side of the wheel wells and under the inwardly turned pickup bed rails. Since the added bed volume was irregularly shaped, usable load space was typically increased only for loose cargo such as dirt, sand, gravel, and the like.

With their evolution to becoming more comfortable and versatile vehicles, pickup trucks have become one of the most popular types of vehicles in North America. The two top selling vehicles of all types for more than a decade have been full size pickups, and their market share is still increasing. A large part of the appeal of these vehicles has been their ability to carry large objects and heavy loads in their beds. Compared to a standard automobile with an enclosed trunk, a serious drawback to these vehicles has always been their inability to carry smaller loose items such as tools and personal belongings in a hidden and secure place.

To solve the lack of hidden and secure storage space in pickups, several manufacturers have developed various storage boxes that fit inside the pickup bed. Currently, the most prevalent style is a storage box that sits on top of the pickup box rails across the front of the bed. These are commonly called cross body tool boxes. This design provides hidden and secure storage space, but since they typically measure about two feet from front to back, they reduce the total usable bed length by up to one fourth. These boxes usually do not extend all the way down to the bed floor at the center so a small space remains underneath for some long items, but taller stacks of building material, or other long cargo such as riding lawn mowers, couches, and the like no longer fit in the bed. A good portion of one of the primary purposes of a pickup truck, the ability to carry large cargo, is compromised.

The cross body tool box sits on top of the bed rails and has a raised top to provide additional storage space. This requires reaching higher than the bed rails for access to items near the sides of the pickup, and usually requires climbing up into the bed to reach items stored in the bottom of the storage box towards the center. The mounting location on top of the bed rails eliminates the possibility of installing a canopy, tonneau cover, stake sides, or the like.

A variation on the cross body tool box that can be used with a canopy, tonneau cover, or stake sides is the storage chest. It doesn't bolt on top of the rails, but sits on the bottom of the forward part of the bed. Like the cross body design, it also reduces usable pickup bed length and cargo space by a significant amount. Its location makes access to the storage space difficult or impossible without climbing up into the bed.

Side storage boxes are also available that fit forward or rearward of the pickup box wheel wells that don't reduce the usable length of the pickup box. They fit in the space just on either end of the wheel wells and extend partially over them. This limits their length and doesn't allow storage of long items such as shovels, skis, oars, fishing poles, and the like. They do not fit under the bed rails so they are limited in width to the distance between the inboard side of the wheel wells and inside edge of the bed rails.

Another type of side box that is available fits on top of the wheel wells and extends the length, or most of the length, of the bed. This allows storage of longer items, but is also limited in width to the distance between the insides of the wheel wells and the inside edge of the bed rails. They have flat bottoms and mount on top of the wheel wells making them quite shallow. To gain more depth these boxes usually extend above the sides of the rails. This makes access higher than the tops of the bed rails and eliminates the possibility of installing a canopy, tonneau cover, or the like. Most of the storage box designs described above require drilling holes in the vehicle's side rails or pickup bed and use bolts to attach securely. Drilling holes in the vehicle's sheet metal decreases its value and leaves bare metal edges that are prone to rust.

In the four decades since the introduction of the modern full body width pickup bed there has not been a storage box product available with capacity approximating that of a standard automobile trunk that provided full access to that storage capacity and did not compromise the approximately four foot wide by eight foot long and eighteen inch deep primary cargo area of a full size pickup bed.

SUMMARY OF THE INVENTION

The concept of the present invention is to fit a specialized storage container that closely matches the configuration of the space along the entire length on either side of a full width pickup bed that includes all the area outboard of the wheel well. The specialized storage container described in all its variations is an enhancement to pickups with their original full width pickup beds in place and is not related to commercial service or utility boxes that replace the entire pickup bed. The storage container's location outboard of the wheel wells does not interfere with the primary pickup bed load area, retains the ability to load four by eight foot sheets of material as high as needed as well as other large cargo such a riding lawn mowers or couches, and does not interfere with the installation of canopies, tonneau covers, stake sides, or the like.

In its preferred embodiment, the storage container features unique retention for easy installation and removal, and angled tops and ends for functional and aesthetic enhancement. The invention also utilizes the area underneath the bed rails for additional storage space and as part of the retention system. Since this storage space is wider than the access to it from the top or the back of the bed, the invention's angled top and end openings provide a unique solution to provide full access to the storage space.

Specifically angled openings at the top and ends of the storage containers make the openings as wide as the space inside. This feature makes is possible to easily load and unload the largest possible item that can be stored inside the container and is unique to the invention. Since the full length side storage container is configured to fit over the wheel well and extend the length of the bed, the upper portion easily accommodates long items such as shovels, skis, oars, fishing poles, and the like. A matched set of full length side storage containers, one on each side of the bed, provides secure storage areas with volume similar to that of an automobile trunk.

The containers feature doors or lids in several variations so that stored items are accessible from either outside, inside, or from the back of the pickup bed. Interior doors or lids can be removable so the storage space can be accessed even if the pickup box is full of cargo. For maximum accessibility from an open tailgate, the top lids wrap around the back of the container so the access height is the same as on the side, a feature unique to the invention. Separate end doors can be optionally provided for access all the way to the bottom of the rearward end of the container.

The top lid can be a single piece unit for each side container or be a pair of lids, one at the front and one at the rear. On an eight foot long bed, a container with a pair of lids has a solid top area for about a foot and a half over the wheel well. On a six and one half foot short bed the doors come nearly together at the center. This feature allows the same set of four top doors to be used on either a long bed or short bed storage box and is unique to the invention.

The full length side storage container can easily be installed by rotating up underneath and behind the rails with upwardly extending members that lock the entire top edge in place without requiring any fasteners. The bottom can be secured by using existing pickup box tie down and other bolt locations, by attaching to a pickup box front bulkhead or floor protector, or a variety of common fastening methods. The top retention feature permits quick and easy installation, and equally quick and easy removal of the storage boxes when the full volume of the bed is needed for loose loads such as dirt, sand, gravel and the like, and is unique to the invention. The full length side container can be made in a variety of ways from a double walled self contained unit, to a single inboard wall that is fastened to or is made a permanent part of the bed so the outside of the bed forms the outside of the container.

The invention also applies to smaller compact or mid-size pickups. There is no standard bed size for these pickups, so for simplicity, the description and drawings in this application refers to full size long bed models. Full size long bed pickups are the most common single model sold. A full length side storage container for a small pickup or for a short bed full size has the same advantages of a container for a full size long bed pickup and differs only in size, not in essential and unique features.

The invention, its relationship to previous patents in the field, and its design variations will be clarified in the following description and drawings.

UNITED STATES PATENT REFERENCES CITED

Though no full length enclosed side storage container for pickup beds has been a commercial success as evidenced by their absence in the market, there have been patents granted on similar devices.

Henri U.S. Pat. No. 4,705,317 addresses the design concept of a side storage container for pickups, even though the preferred embodiment and descriptions refer to an assembly made from separate pieces that are joined and sealed to each other and the pickup bed, and not a fully enclosed unit.

The invention differs from Henri in many ways, but most significantly in three key areas. First, the Henri design has slightly sloped doors or lids for the stated purpose of allowing rain run off to prevent rain from entering the container.

Henri makes no reference to the purpose of the sloped door at a great enough angle to make it possible to load objects through the door that are as wide as the storage space that exists between the inside wall of the container and the outside wall that is limited by the pickup bed side wall, or is there any indication of the discovery of that concept. Second, Henri does not utilize a wrap-around rear door for improved access or to facilitate loading long items and the slight slope of the Henri door make would make the feature too small to be useful. The Henri door overlaps the back of the container for sealing purposes only and does not enlarge the opening. Third, the Henri multi-piece design is secured in place exclusively with conventional fasteners with no provision for interlocking retention with the pickup bed to allow fast installation or removal with a minimum of effort.

Sisler U.S. Pat. No. 3,727,971 also addresses the design concept of a side storage container for pickups, even though the preferred embodiment and descriptions refer to dividing the container into three separate sections with walls between them.

The invention differs from Sisler in many ways, but most significantly in three key areas. First, the Sisler design has flat topped doors or lids making it impossible to load objects as wide as the storage space that exists between the inside wall of the container and the outside wall that is limited by the pickup bed side wall. Second, the Sisler design does not exhibit any variation of a wrap around rearward door to facilitate access or the loading of long items. Third, the Sisler design is secured in place exclusively with conventional fasteners with no provision for interlocking retention with the pickup bed to allow fast installation or removal with a minimum of effort.

Fletcher U.S. Pat. No. 4,789,195 is for a side storage container for pickup beds that is only relevant to the invention in that it provides storage space outboard of the wheel wells. It does not utilize the storage space underneath the pickup bed rails, does not provide angled doors specifically for access to that space, and does not have provision for interlocking retention with the pickup bed to allow fast installation or removal with a minimum of effort. The Fletcher design does provide access to the rearward portion of the container, but this is accomplished with pull-out drawers, not wrap around lids or end doors.

Taylor U.S. Pat. No. 4,946,215 is a storage box that fits sideways across the rearward end of a pickup bed completely blocking access to the rest of the bed. The Taylor patent is referenced only because it has an angled lid. The storage box is intended to approximate the location and design of an automobile trunk. The angled lid lowers the height of the rearward container wall to just above the bumper in the same manner and for the same purpose as that for an automobile trunk, and is not for the specific purpose of providing an opening width within a restricted space to be equal to a storage space of a particular size.

Ellis U.S. Pat. No. 3,664,704 is a multiple component storage box group for pickup beds that is only relevant to the invention in that it provides storage space outboard of the wheel wells. It does not utilize the storage space underneath the pickup bed rails, does not provide angled doors specifically for access to that space, and does not have wrap around door ends for improved access from the tailgate or for loading long items. The Ellis design also does not have any provision for interlocking retention with the pickup bed to eliminate or minimize the need for additional fasteners to allow fast installation or removal with a minimum of effort.

Fuller U.S. Pat. No. 1,412,680 shows a lid of a tool box located just forward of the front seat, described as inclining forwardly and downwardly to the front wall, was designed in that manner for the stated purpose of avoiding interference with the movement of the feet of the operator or occupant.

The Fuller design was not intended to utilize the storage space underneath pickup bed rails. The angled lid also was not configured specifically for the purpose of access to that space, and the retention method was conventional.

BRIEF DESCRIPTION OF THE DRAWINGS

FIG. 1 is a rear view of a traditional pickup bed with flat side walls.

FIG. 1A is a cross sectional view of the top edge of the traditional pickup bed.

FIG. 1B is a rear view of the right half of a traditional pickup bed.

FIG. 2 is a rear view of a contemporary full width pickup bed.

FIG. 2A is a cross sectional view of the top edge of a contemporary full width bed.

FIG. 2B is a rear view of the left half of a truck end view of the enclosed space.

FIG. 2C is a three quarter rear view with a four foot wide primary storage area.

FIG. 5 is a rear cross sectional view of the left half of a full width pickup box.

FIG. 5A is a rear cross sectional view of a full width pickup showing how a large object can be loaded from the inside of the bed.

FIG. 5B shows the same advantages of loading or unloading through the angled opening.

FIG. 11A shows a variation of the container of FIG. 11

FIG. 13 shows a variation of construction of a side storage container.

FIG. 13A shows the container of FIG. 13 with the addition of a door.

FIG. 15A shows a single flat top door.

FIG. 16A shows a variation of the container of FIG. 16.

DESCRIPTION OF THE PREFERRED EMBODIMENT

Figure 4:
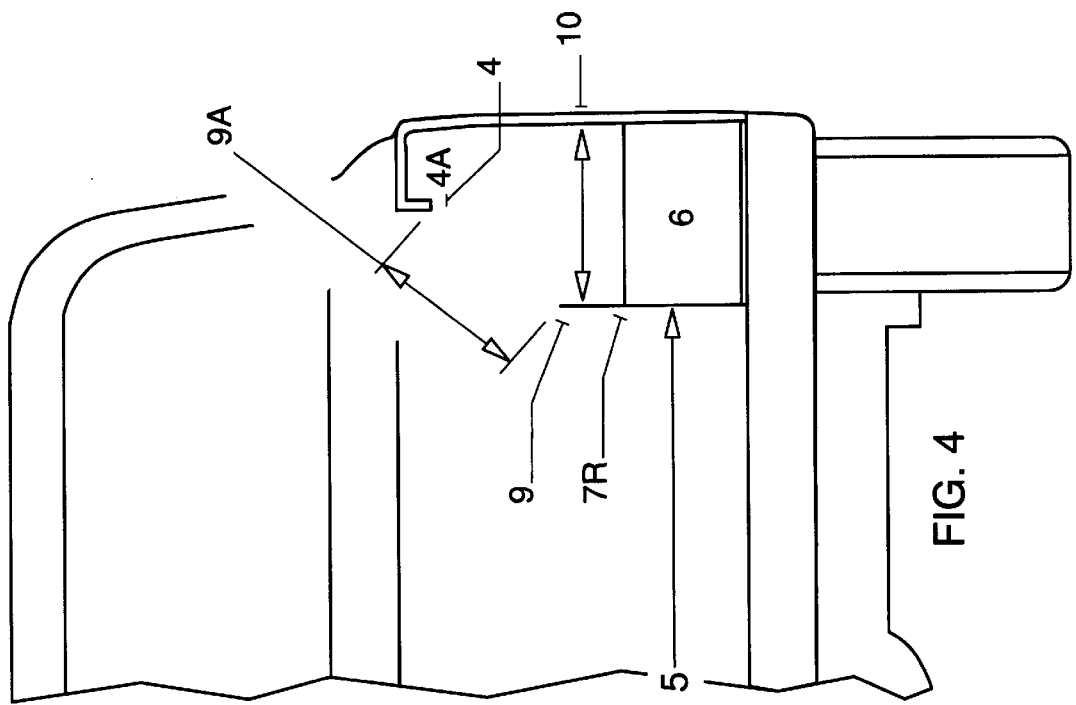
FIG. 4 is a cross sectional right half end view of a full width pickup box.

Reference will now be made to the drawings wherein like numerals refer to like parts throughout. In particular, FIG. 1 shows a rear view of a traditional pickup bed with flat side walls and the fenders 3 attached on the outside of the bed B. Maximum width 5 extending between wheel wells 6 represents the approximately four foot wide primary cargo area limited by the side walls 1 of the bed B. As shown in cross sectional view of FIG. 1A, the top edge of the traditional pickup bed with its outwardly turned bed rail 2 as viewed on view lines X—X of FIG. 2C and FIG. 9. All subsequent cross sections in all the following drawing figures are shown from the same sectional view. Storage space 71 is shown in FIG. 2B extending inward from side walls 1 the length of the pickup bed B to the cab. The maximum width 5 is the approximately four foot wide primary cargo area that is determined by the full width bed by the inboard edges of the wheel wells 6.

As shown in FIG. 2B the enclosed space, including the portion covered by the inwardly turned rail 4A, on the left side of a full width pickup bed that is available without intruding into the four foot wide primary storage area 5. Utilizing the space 4A covered by the rail 4 increases the width of the storage space outboard of the wheel wells 7L by as much as one third and is a key feature of the invention. The four foot wide primary storage area 5 delineated by dashed lines (see FIG. 2C) identifies the space outside of, and on each end of, the wheel wells 6 that is used for the full length side storage container that is the invention. 7L is the left side full length storage container space and 7R the right side.

Figure 3:
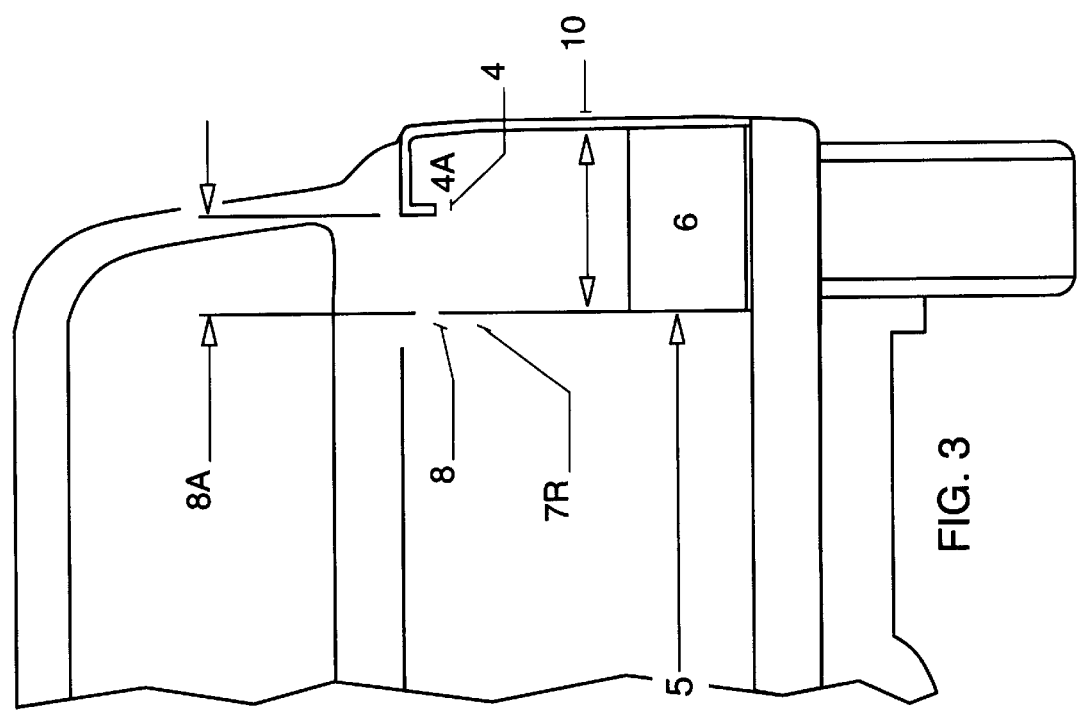
FIG. 3 is a cross sectional right half end view of a full width pickup box.

The bed rail 4 (see FIG. 3) protrudes inwardly over portion 4A of the enclosed storage space 7R outboard of primary pickup bed cargo area 5. If top opening 8A is the horizontal distance between inboard wall 8 and the inside of bed rail 4, it is obviously smaller than distance 10. Distance 10 is the maximum width from the outside of the wheel well to the inside of the pickup bed side wall that defines the maximum width of the enclosed storage space 7R that does not intrude into the primary cargo area 5.

The inboard wall 9 (see FIG. 4) extends vertically a specific height to create angled opening 9A from the top of the inboard wall to the edge of the bed rail 4. Creating an opening 9A that is equal to the maximum width of the enclosed storage space 10 is a key feature unique to the invention. By way of illustration of the problem solved by the above described key feature, FIG. 5 shows a rear cross sectional view of the left half of a full width pickup box with object 11 unable to be loaded into enclosed space 7L because the opening width 8 is much narrower than object 11 and the maximum enclosed storage area width 10. A large object 11 can be loaded from the inside of the bed through angled opening 9 in position 11A and stored on the floor of enclosed space 7L in position 11B. If a door or lid 12 is made to cover the angled opening in a straight line there is additional space above object 11 in position 11B for items 13 as shown in enclosed storage space 7R.

As is shown in FIG. 5B, the same advantages of loading or unloading through the angled opening 9 with a variation that has a door or lid 15 with a flat or squared-off top to gain some storage space at the top of the container in exchange for a more utilitarian and less open appearance. The lids 12 or doors can be one piece, two piece, three piece, folding, sliding, hinged, or hinged and removable as is common to other storage enclosures and obvious to those knowledgeable in the field. The interior openings for the storage enclosures are configured to be at a specific angle so they are wide enough to make full use of the available storage space, and these openings are independent from the shape of the top of the lid. As described previously, this feature is essential for reasonable access without modification to the pickup bed in its existing form and is unique to the invention. That this specifically angled opening has not been utilized on any pickup bed side storage box or enclosure in the four decades since the introduction of the full width pickup box would indicate that it is not obvious to those knowledgeable in the field.

Figure 6A:
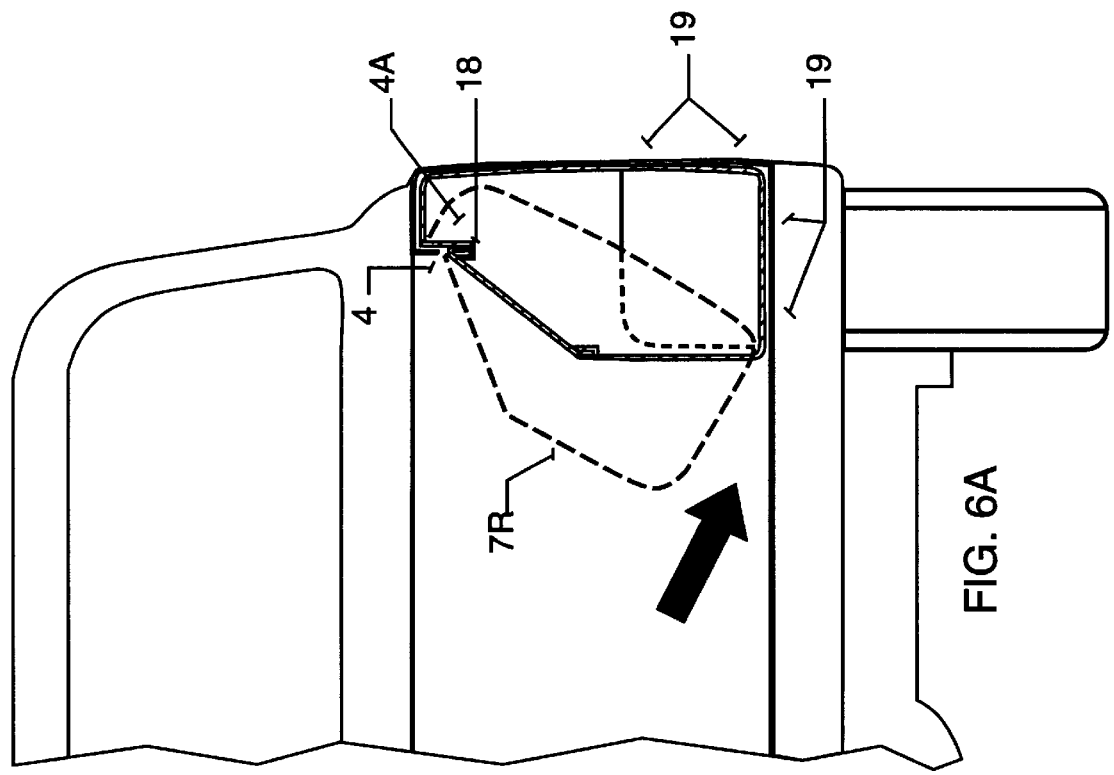
FIG. 6A shows enclosed storage space 7R with a dashed outline to indicate the position for installation.
Figure 6:
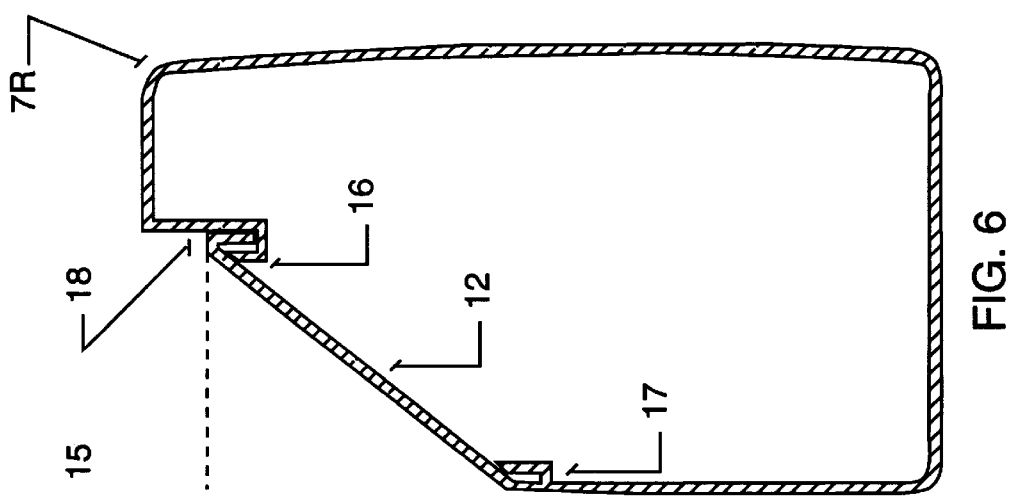
FIG. 6 is a cross sectional end view of the right side enclosed storage space.

Referring now to FIG. 6. Element 12 represents an angled lid and dashed line 15 represents a square top lid variation. Elements 16 and 17 are examples of sealed surfaces between the enclosed storage space and its lid of which there are many variations common to other types of storage enclosures and obvious to those knowledgeable in the field. Element 18 is the raised portion of removable enclosed storage space 7R that is shaped to fit behind the inward edge of rail 4 and conform to the space 4A just under the rail. FIG. 6A shows enclosed storage space 7R with a dashed outline to indicate the position for installation with the raised portion 18 inserted behind rail 4 and into space 4A. 7R is shown in cross sectional end view after the bottom portion has been rotated in against the inside pickup bed wall in the direction as shown by the large arrow. Raised portion 18 securely retains the entire top of the enclosed storage container without requiring any additional fasteners simplifying installation and removal and is a key feature that is unique to the invention. With the top securely held in place, only the lower portion of the storage container needs to be fastened in the general area 19 to finalize the installation. The lower portion can be secured to a front bulkhead, a bed liner, a bed mat with stiffener, or to fastener locations already available in many pickup models. The variety of fastening options for the full length side storage container is unique to the invention. Other types of side storage containers do not have retaining feature 18 to secure their tops, therefore requiring a more extensive fastening method and structure making them more time consuming and difficult to remove or install.

Figure 7:
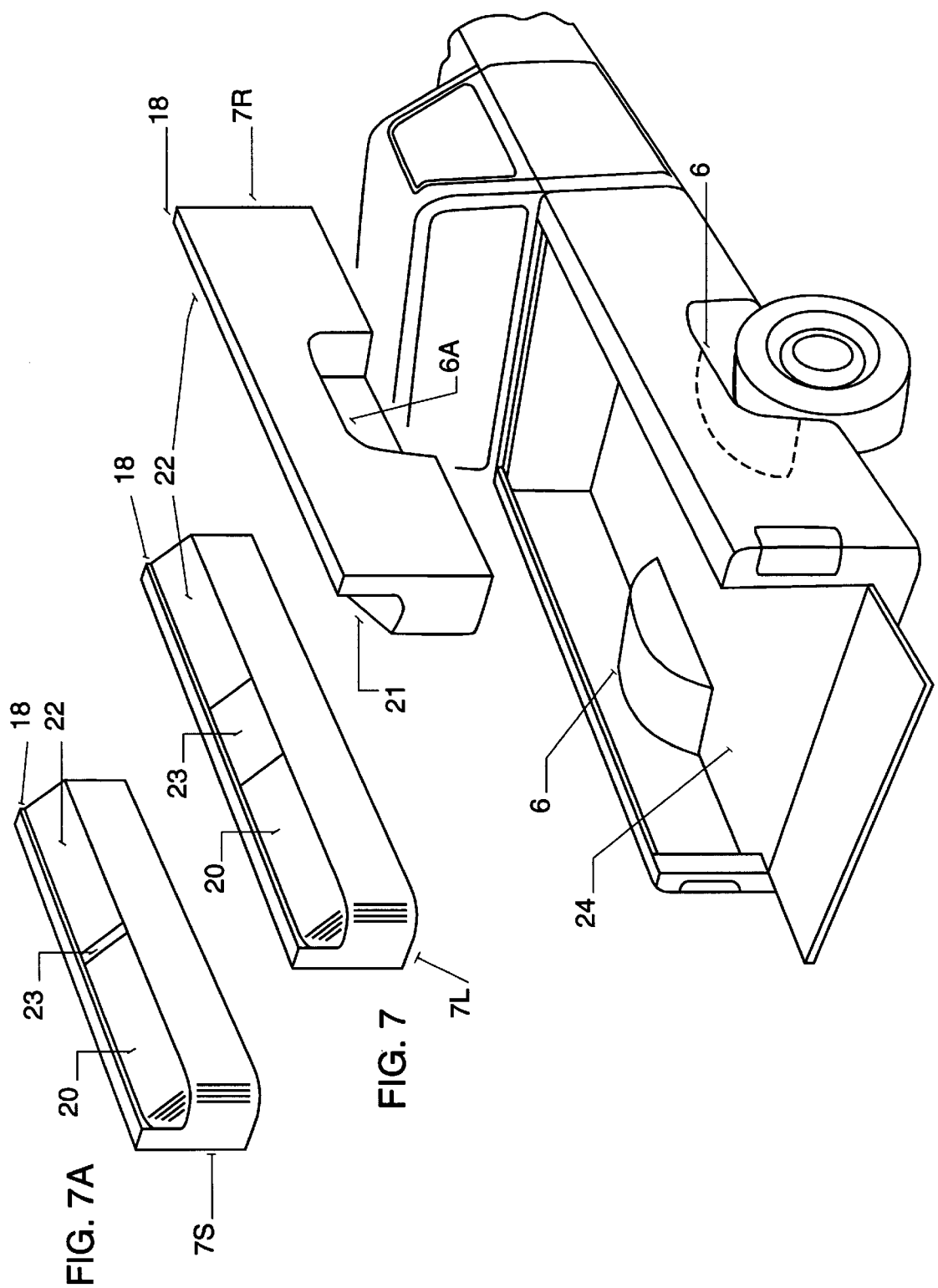
FIG. 7 is a three quarter view of a full width long box pickup bed.

The three quarter rear view of FIG. 7 shows a full width long box pickup bed 24 illustrating wheel well 6. Pickup bed 24 and wheel well 6 can be formed of conventional painted sheet metal, urethane coated sheet metal, or a closely conforming molded plastic bed liner. The bed liner is qualified as closely conforming as most bed liners do not fit tightly against the side walls of the pickup bed, especially at the bottom, and waste much of the space that must be used to maximize the storage area of a full length side storage container. Suspended above the pickup bed so they can be seen fully are removable full length side storage containers 7L and 7R. Storage containers 7R and 7L are mirror images except for any detail differences on the corresponding sides of the pickup bed that are required for them to conform closely to the bed surfaces. The back side of storage container 7R shows cavity 6A where the surface is contoured to fit over wheel well 6. Other small relief areas and contours may be required for the storage container for a specific pickup model to conform closely around gas tank filler inlets, stake pockets, reinforcing ribs, and the like.

There are four lids or doors for access to the enclosed storage space in this variation of a pair of full length side storage containers. This variation is particularly suited to molded methods of manufacture where rounded contours are easy to produce and tooling is expensive so the maximum utilization of each tool is desired. The left rear lid 20 and lid 21 wrap around the back for better access and loading long items. They are mirror images, and would require different molds or cavities. Front lid 22 is symmetrical for use on either side and requires a single tool. 18 is the top retention feature. The space 23 between the forward and rear lids allows the lids for the long box pickup storage container shown to also be used on a short box pickup model as well as add structural support. A short box pickup full length storage container is about eighteen inches shorter eliminating most of space 23 to bring the forward and rear lids almost together at the center of short bed container 7S as shown in FIG. 7A shown just above FIG. 7 for comparison. The full length side storage containers lids or doors can be secured against theft by tumbler, cam type and over-center locks and latches, cable and electronic remote releases, and other accepted methods familiar to those knowledgeable in the field.

Figure 8:
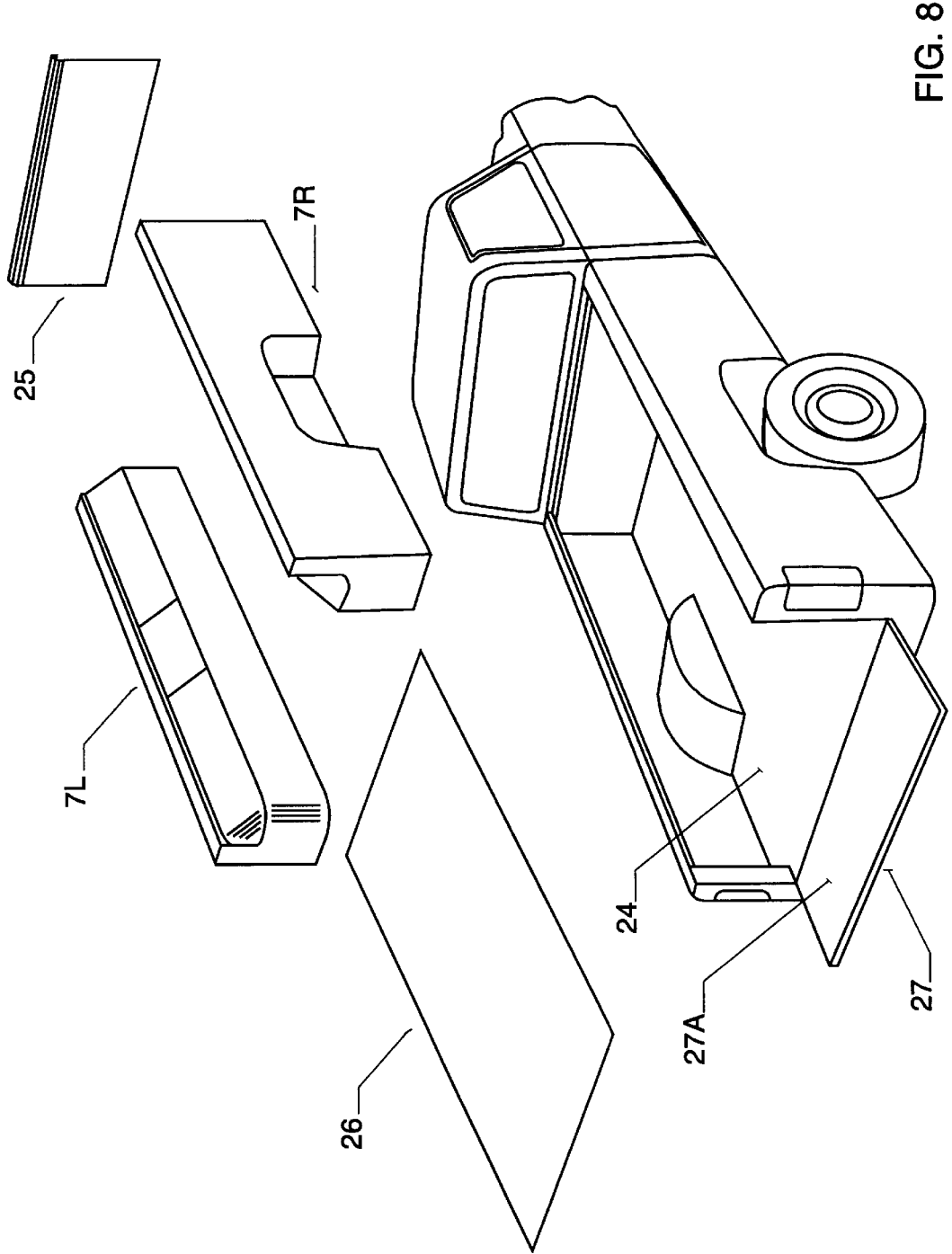
FIG. 8 shows two removable storage containers combined.

Illustration of how two removable full length side storage containers can be combined with other pickup bed accessories to cover the standard bare interior pickup bed surfaces 24 for protection against damage, is shown in FIG. 8. In addition to the 7L and 7R full length side storage containers, a front bulk head protector 25, bed mat or floor cover 26, and tailgate protector 27A to cover tailgate 27 can be added in any combination to a painted sheet metal, molded plastic, composite, or urethane coated pickup bed 24. This versatility allows the pickup owner to choose everything from a single full length side storage container to many possible variations of a complete pickup bed storage and protection system according to his or her wants and needs.

Figure 9:
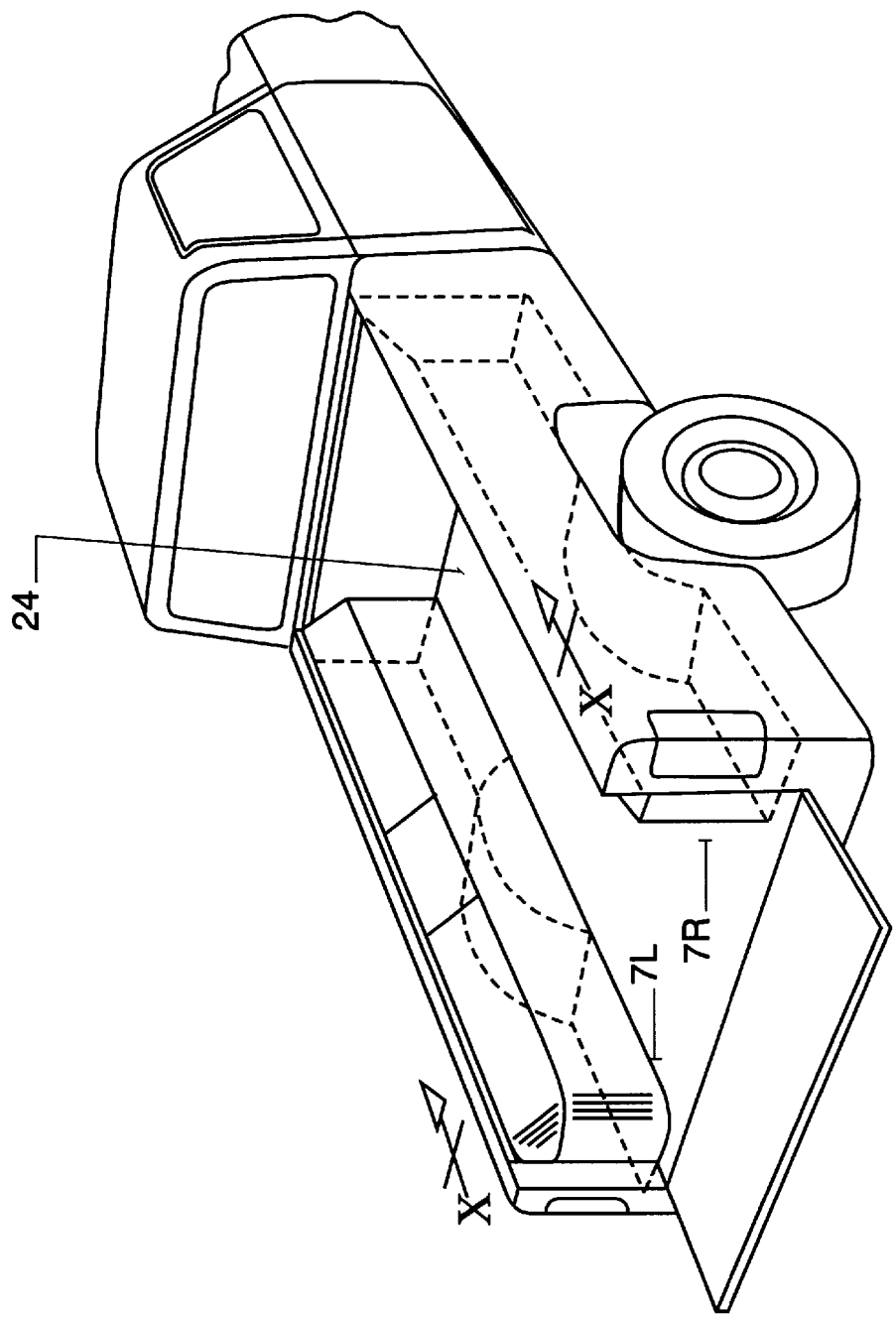
FIG. 9 is a three quarter view of a full size pickup long bed with storage containers installed.
Figure 10:
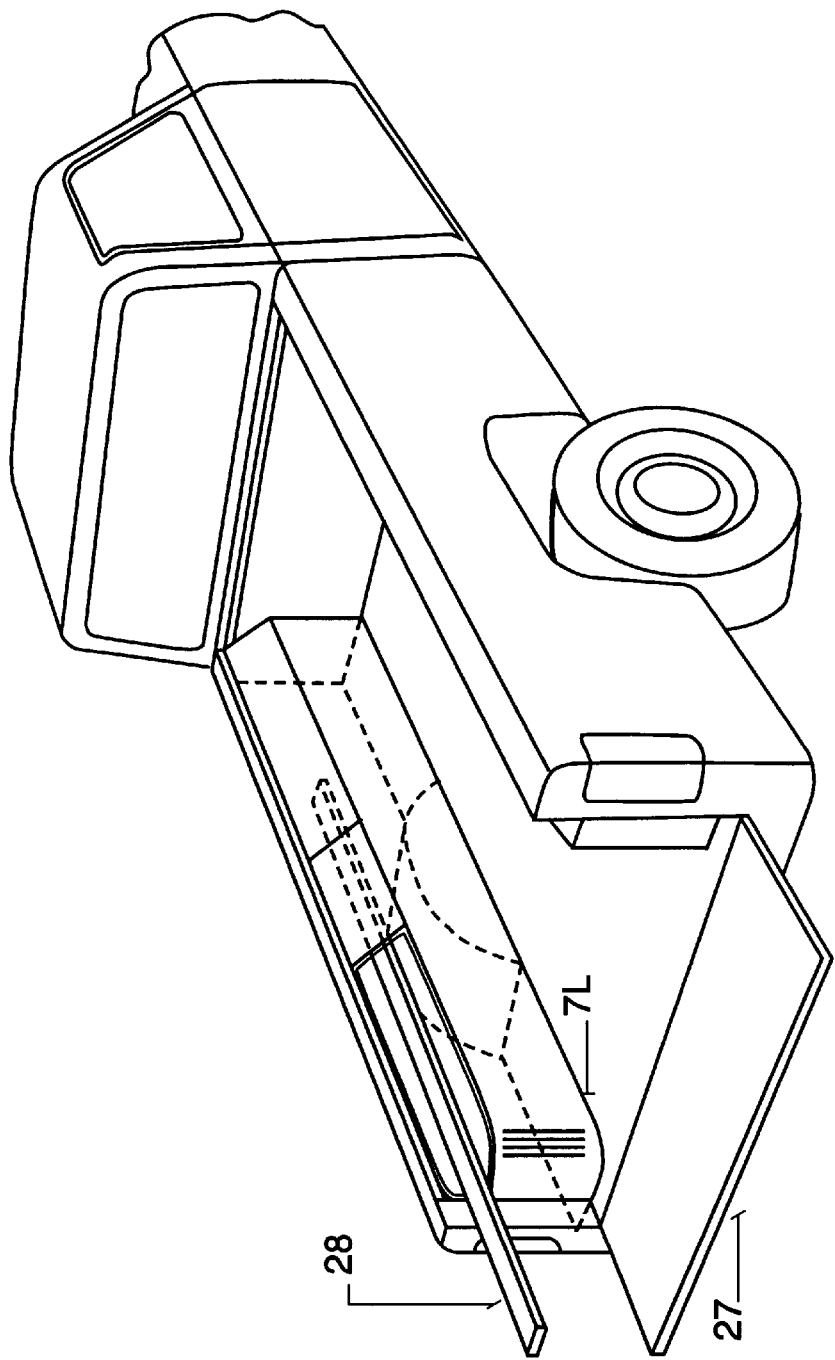
FIG. 10 shows a wrap around rear door for loading long items.

As is illustrated in FIG. 9, besides adding substantial enclosed storage space, full length side storage containers 7L and 7R installed in pickup bed 24, also convert the convoluted pickup bed interior surfaces into smoother and more aesthetically pleasing contours. Another benefit in this variation with angled tops and rounded or angled rearward storage container ends is that there is little perceived reduction of open cargo space. View lines X—X for sectional views of the bed and containers are the same as FIG. 2C. FIG. 10 shows how the wrap around rear door allows loading long items 28 such as skis, fishing poles, long handled tools, and the like. The wrap around rear door also improves access to items in the back of the side storage containers from tailgate 27.

Figure 11:
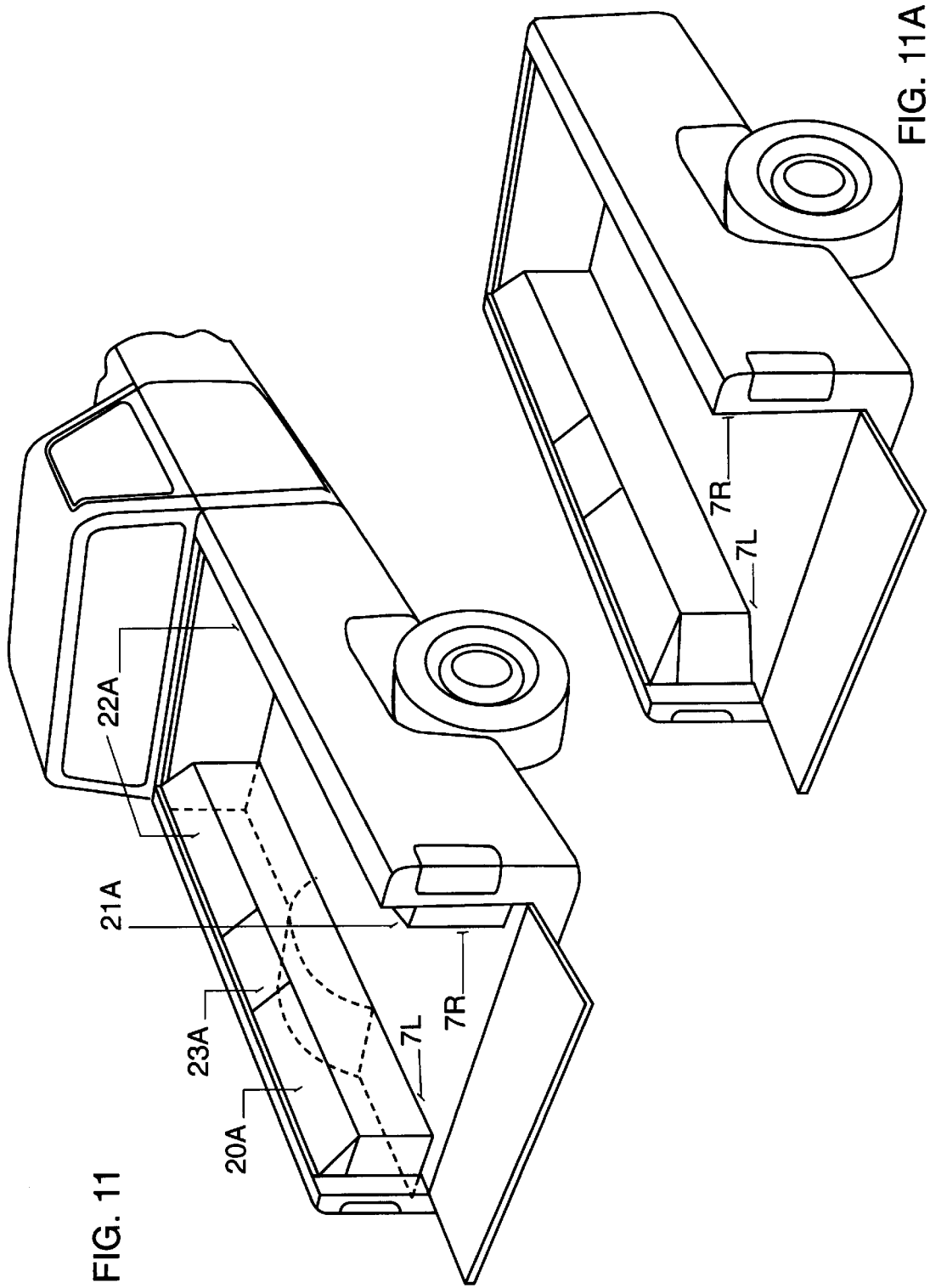
FIG. 11 shows a full length side storage container.

A variation in construction of the full length side storage container 7L and 7R with four separate lids or doors that has the inboard surfaces constructed from flat sheets of aluminum, steel, composite, or other material full length side storage containers 7L and 7R installed in pickup bed 24, is shown in FIG. 11. The outboard surfaces that conform closely to the sides of the pickup bed can either be molded or also constructed from flat sheets. Rear doors 20A and 21A with their wrap around feature, symmetrical forward doors 22A, and the spaces between the forward and rear doors 23A are the same as the molded full length side storage container shown in FIG. 7 except they are constructed from flat sheets of material. A variation with the end of the storage container 7L angled inward for some distance up the side of the storage container, is shown in FIG. 11A. This variation can be either sheet or molded construction. The wider space at the back of the bed and the angled sides make sliding in large cargo easier and streamlines the storage container shape.

Figures 12, 12A:
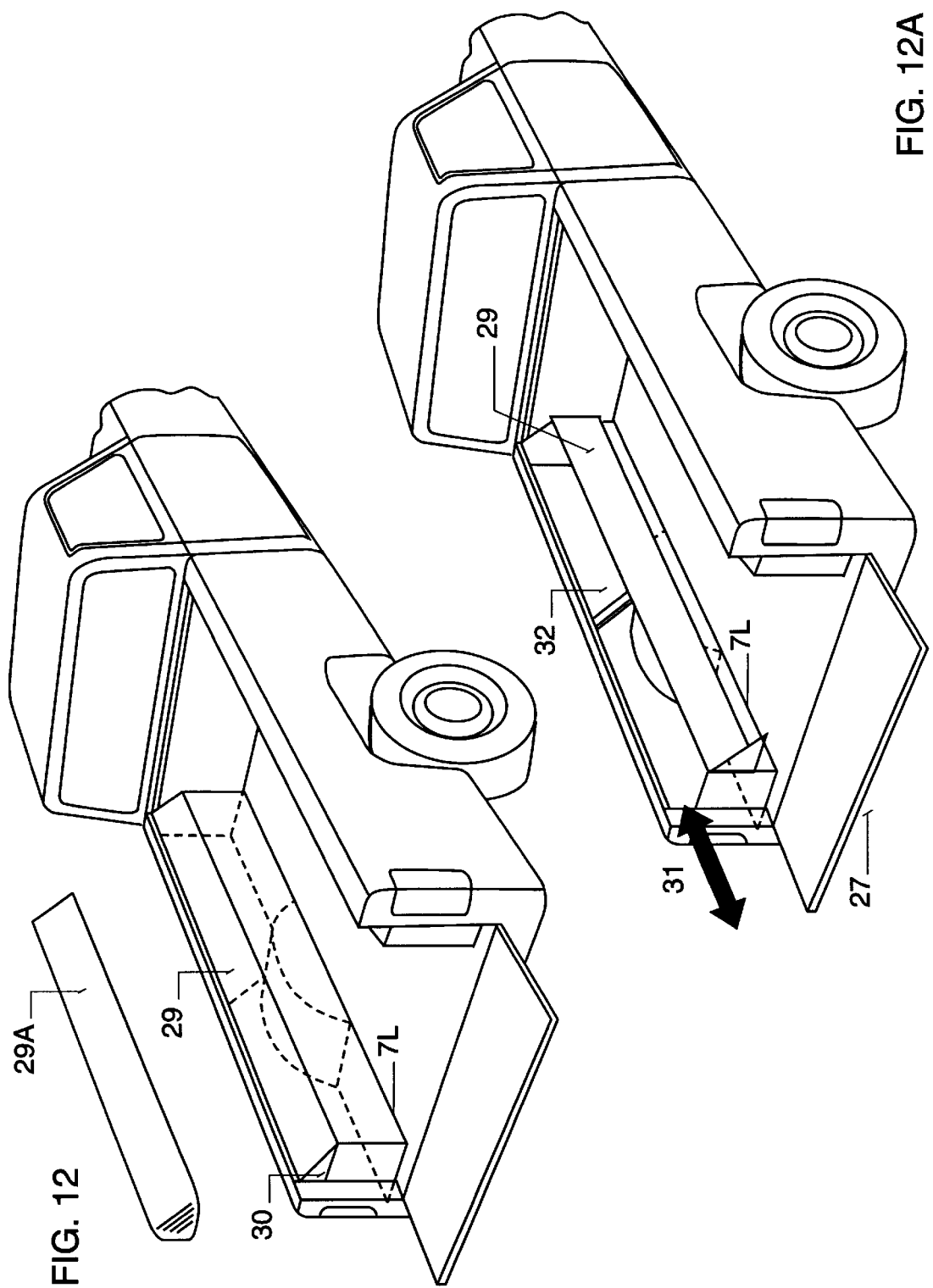
FIG. 12 is a three quarter view of a full length pickup bed with a full length storage container.
FIG. 12A shows a lid with wrap around end feature.

FIG. 12 illustrates a full length side storage container 7L with inboard surfaces constructed from flat sheet with the variation of a single full length lid or door 29 also constructed from flat sheet material. A molded variation of a full length lid or door 29A is shown directly above. FIG. 12A shows lid or door 29 and 29A to have the wrap around end feature 30 for improved access 31 for all items from the tailgate area and also to aid loading long items. With lid or door 29 open, brace 32 can be seen in the center of the angled opening to add structural support in the absence of center piece 23 used on variations with four doors or lids as seen in FIG. 7A. FIG. 13 shows a variation of the flat sheet construction full length side storage container with a single full length lid or door 33 that does not wrap around the end and is shown with a top hinge that opens it upward. Element 33A represents the same lid or door with a bottom hinge and shown opened downward. The large arrows show the opening direction of the lids or doors.

The same full length side storage container as in FIG. 13 is shown in FIG. 13A, with the addition of door 34 on the end for access 35 directly from the back of the pickup bed as shown with the large arrow with tailgate 27 in the open position. Door 34 is shown hinged at the bottom and opened downward. Door 34 can also be hinged at the top, either side, or made to be removable when unlocked or unlatched. Access 35 is useful for loading or removing heavy items such as tire chains or hydraulic jacks from the rearward end of a full length side storage container.

Figure 14A:
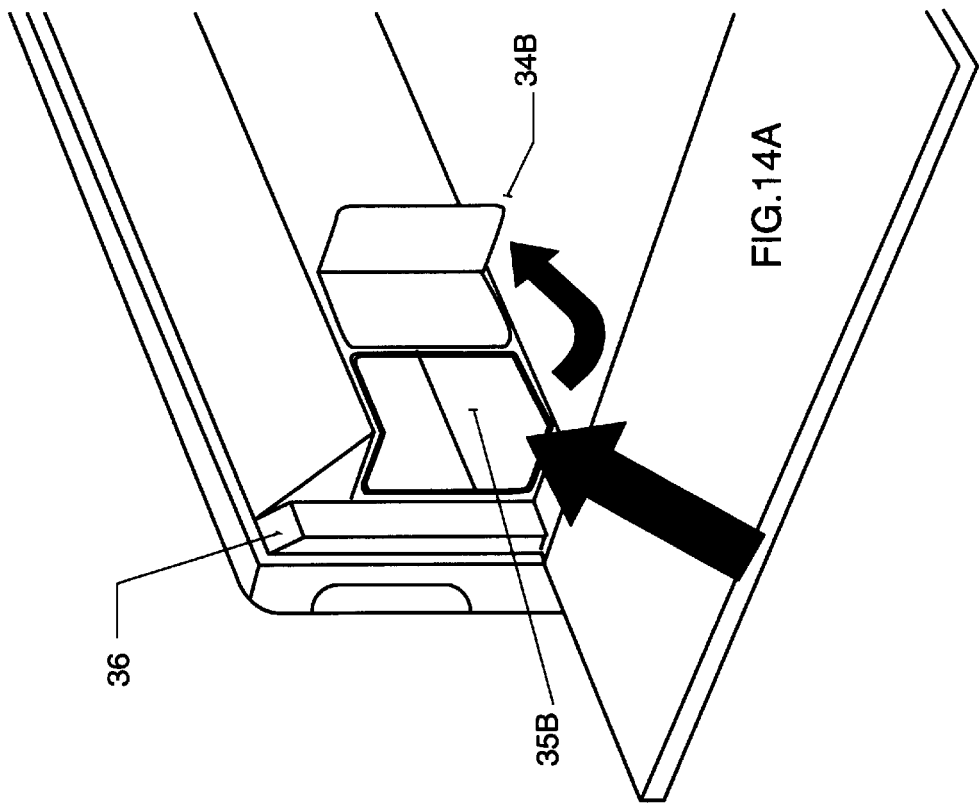
FIG. 14 is a three quarter view of the left rear corner of a pickup bed.
Figure 14:
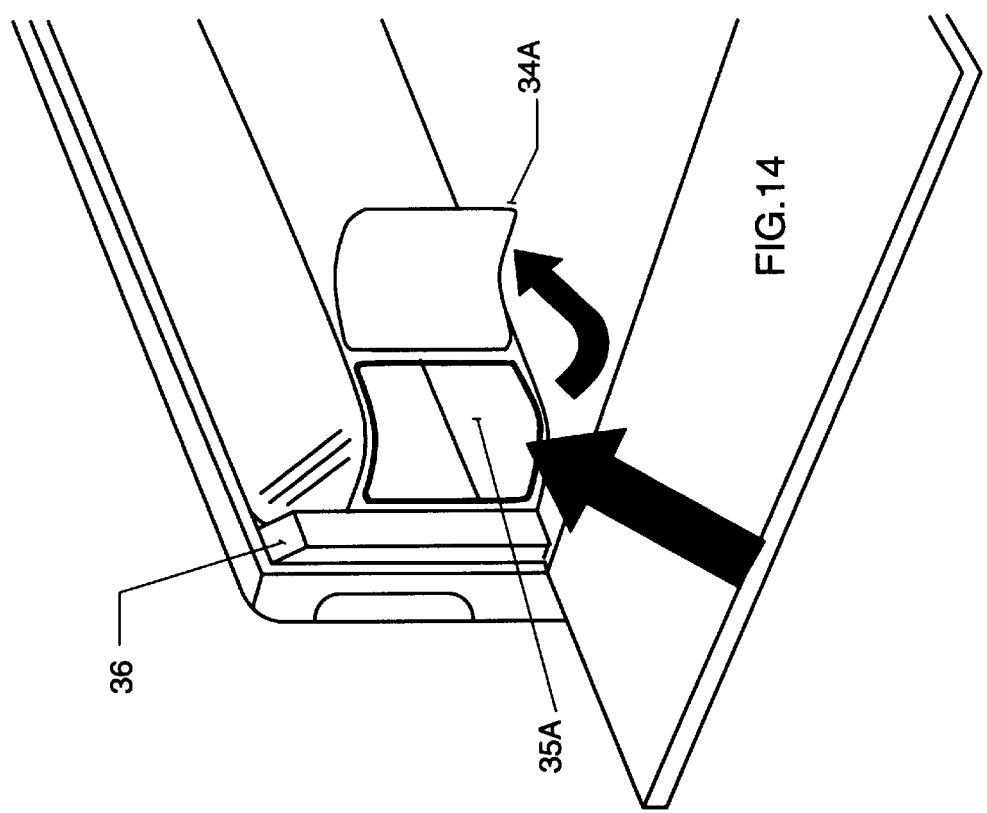

A molded full length side storage container with a wrap around top door or lid, is shown in FIG. 14. On some pickup models vertical support 36 projects inward further than the inside of bed rail 4. To maintain adequate access space 35A in this variation as shown by the large straight arrow, door 34A extends from the back around the corner and along the side of the full length side storage container. The embodiment of FIG. 14A is constructed of flat sheet material, but otherwise the same as FIG. 14. Door 34B and opening 35B with access shown by the large arrow. This variation has the same benefits shown in FIG. 14 but with squared-off shapes that are typically the result of flat sheet construction. Doors 34A and 34B are shown hinged on the forward inboard edge and opened inward as shown by the smaller curved arrows. Doors 34A and 34B can also be hinged at the top, bottom, rearward outboard edge, or made to be removable when unlocked or unlatched.

Figure 15:
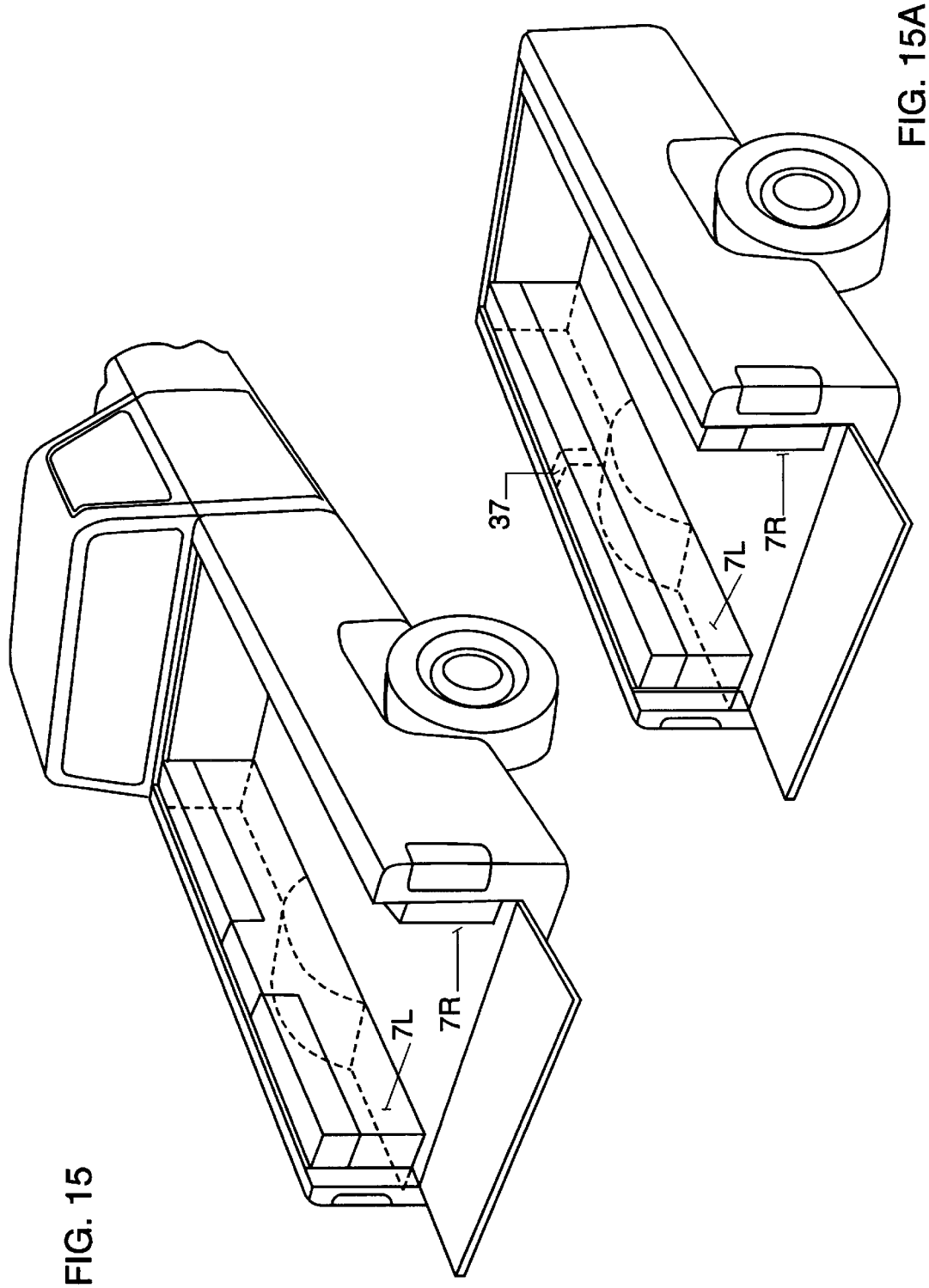
FIG. 15 shows a storage container with flat top lids.

The variation shown in FIG. 15, features four doors, that can be of molded or flat sheet construction, and has all the benefits of the angled door version shown in FIG. 7 and FIG. 11. This variation could also optionally feature any of the end door variations described in FIG. 13A, FIG. 14, and FIG. 14A. FIG. 15A shows a single flat top door or lid per full length side storage container variation of that in FIG. 15. This variation can be of molded or flat sheet construction and has all the benefits of the angled single top door per side versions shown in FIG. 12, FIG. 12A, FIG. 13, and FIG. 13A. Brace 37 follows the shape of the top lid or door for maximum utilization of storage space. Any of the end door variations previously described could also be utilized in this embodiment.

Figure 16:
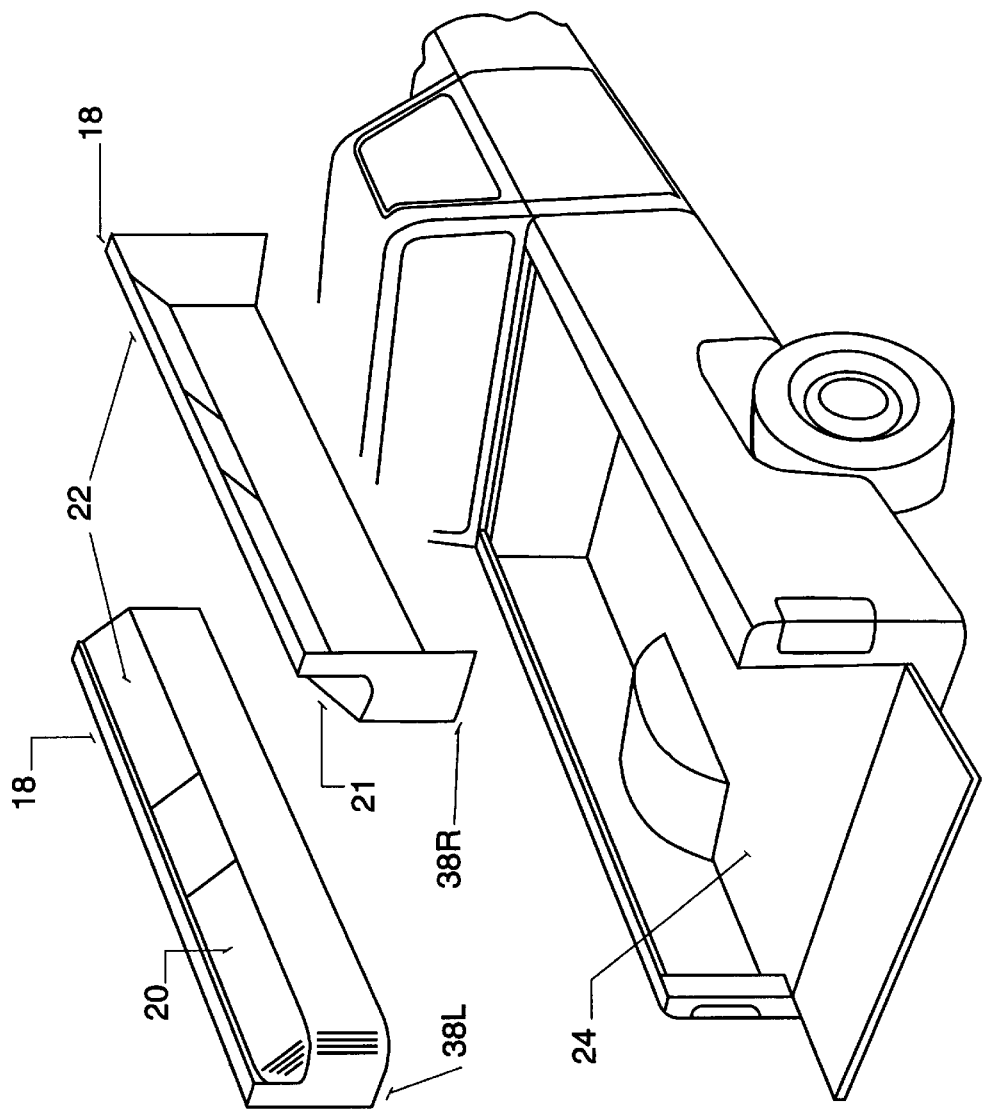
FIG. 16 shows an inboard molded surface of the containers.

The variation shown in FIG. 16 illustrates how the inboard molded containers 38L and 38R create an enclosed storage area when fastened to the pickup bed 24. The entire top of molded containers (also known as inboard surfaces) 38L and 38R can be retained with the same raised surface 18 as featured on fully enclosed variations.

A further variation of a pair of full length side storage containers described in FIG. 16 where inboard surfaces 38L and 38R are combined with specially contoured outboard surfaces 39L and 39R, is shown in FIG. 16A. Outboard surfaces 39L and 39R can created as part of the pickup bed itself, be part of a bed liner, or can be individual parts that attach to the side walls of the pickup bed. The variations shown in FIG. 16 and FIG. 16A can be molded or constructed from flat sheet materials, can be a permanent or removable part of the pickup bed, and can utilize any door variations previously described as well as some yet to be described.

Figure 17:
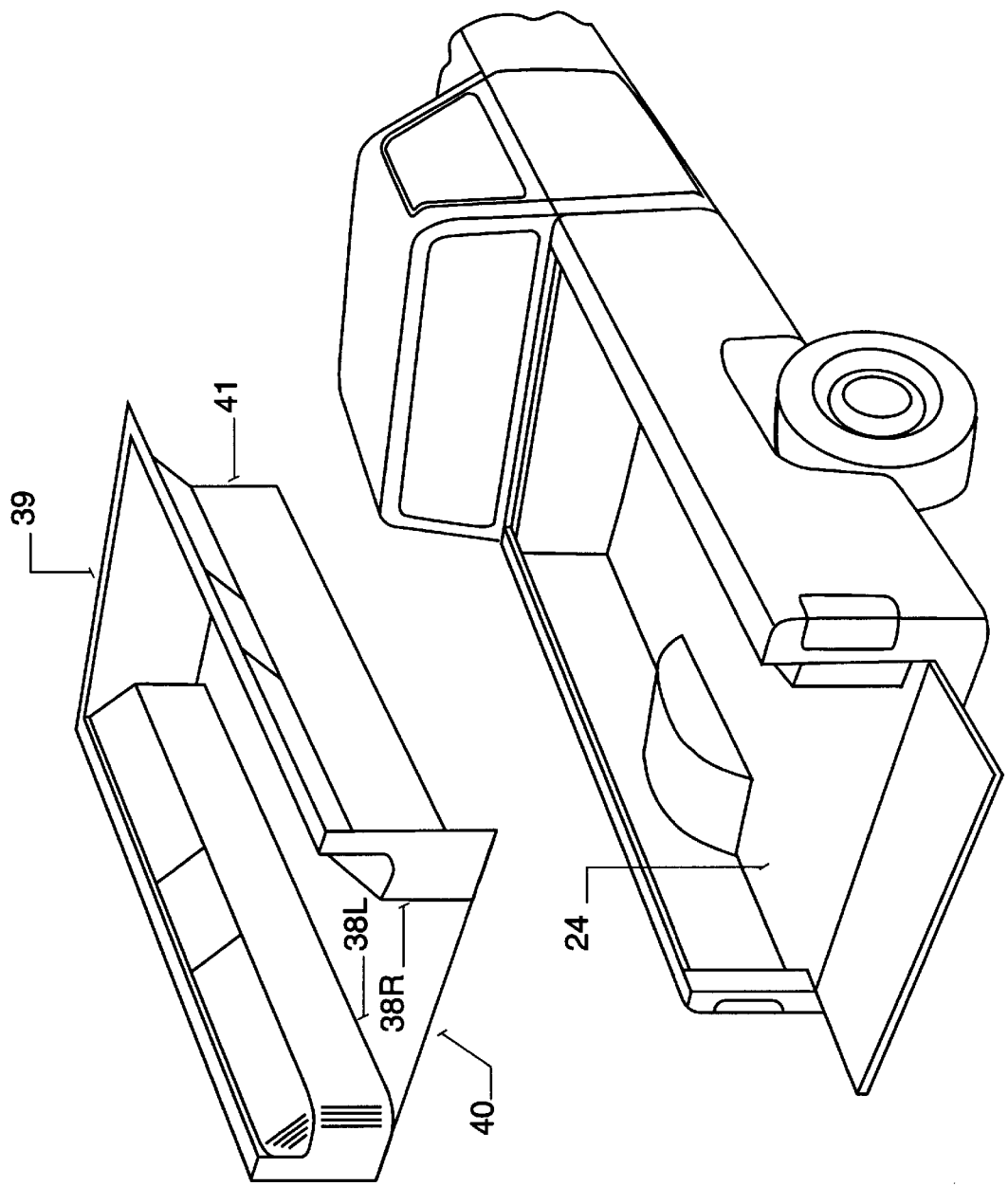
FIG. 17 shows molded or fabricated one piece inboard surfaces.
Figure 18:
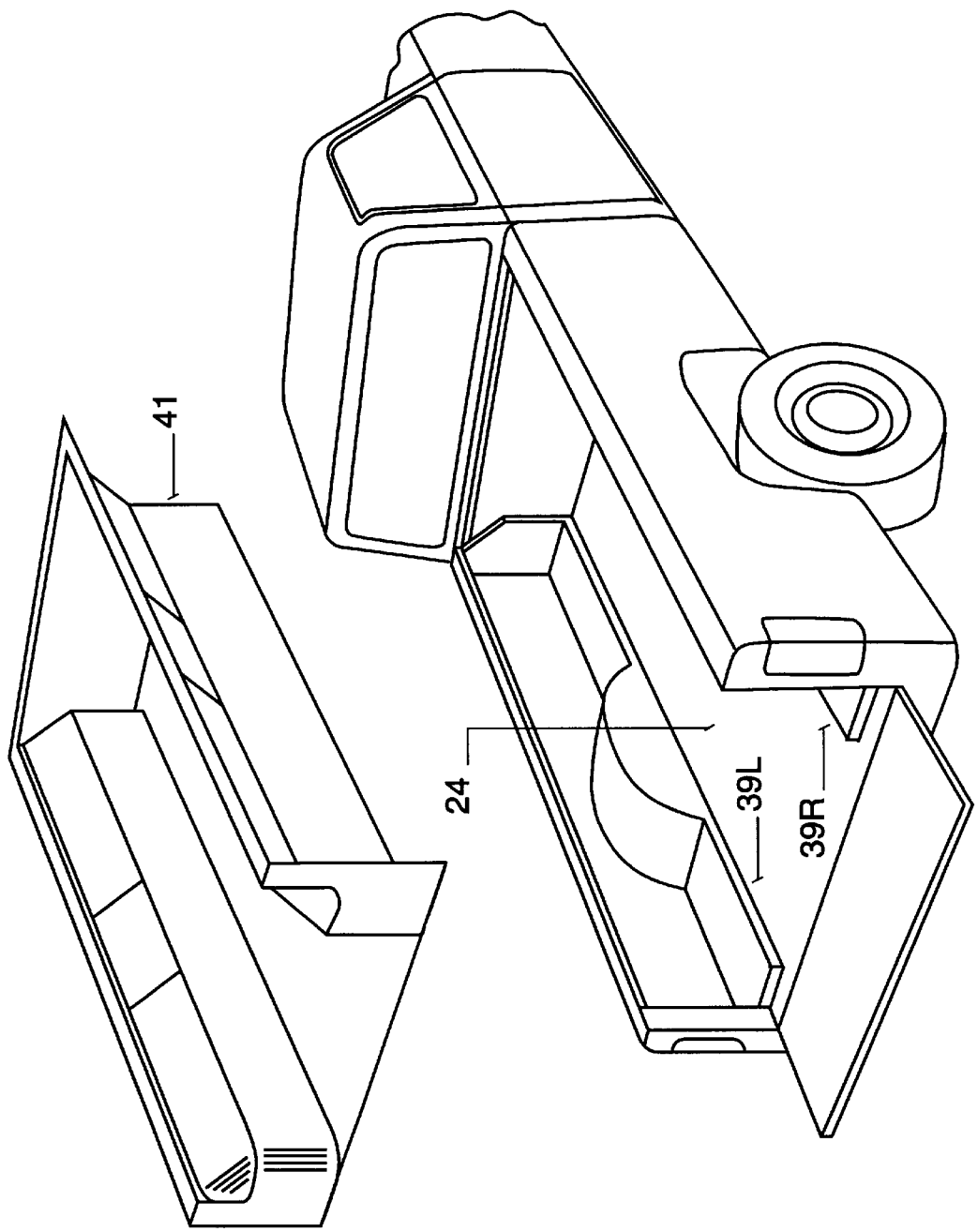
FIG. 18 is a variation of the surfaces of FIG. 17.

A still further variation where the inboard surfaces 38L and 38R are molded or fabricated in one piece with a front portion 39 and a bottom portion 40 is shown in FIG. 17. This creates a one piece pickup bed interior 41 that combines pickup bed protection with the inboard surfaces of the side storage containers. All the same types and quantity of doors or lids can be used as in all other full length side storage container variations. FIG. 18 shows a variation of the embodiment shown in FIG. 17, with the addition of surfaces 30L and 30R that can be created as part of the pickup bed, part of a bed liner, or can be individual parts that attach to the side walls of the pickup bed. Bed interior 33 bonds, fastens, or otherwise mates to 38L and 38R to create a fully lined pickup bed with two full length side storage containers.

Figure 19:
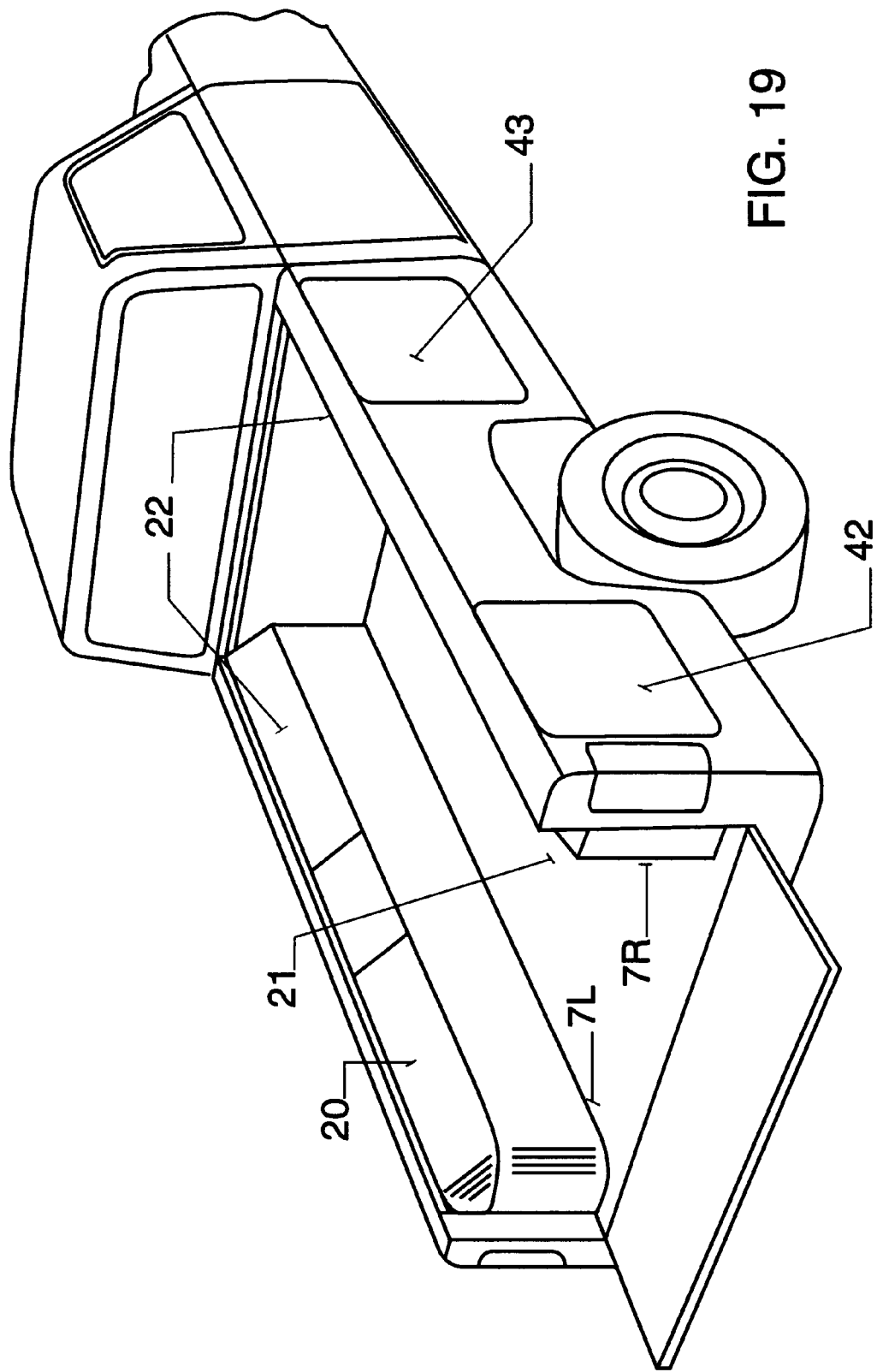
FIG. 19 shows a storage container having access from outside of the pickup bed.

A variation on the full length side storage containers 7L and & 7R featuring additional access from the outside of the pickup bed, is illustrated in FIG. 19. The outside access can be through two doors 42 and 43 on each end of the wheel well on either or both sides of the bed, or through a single door on either end. This access can augment interior access available through lids or doors 20, 21, and 22, any other interior lid or door variation previously described, or only with access through outside doors 42 and 43. The benefit of the invention in the case of outside access only, is the significantly larger storage space available with the side storage containers without intruding into the primary cargo area. In addition, the side storage containers could be optionally removable and the outside access doors double walled to resist denting to make the original maximum volume of the pickup bed available for loose loads such and sand, dirt, gravel, and the like. The side storage containers could be in any of the variations previously described for this application.

Figure 19A:
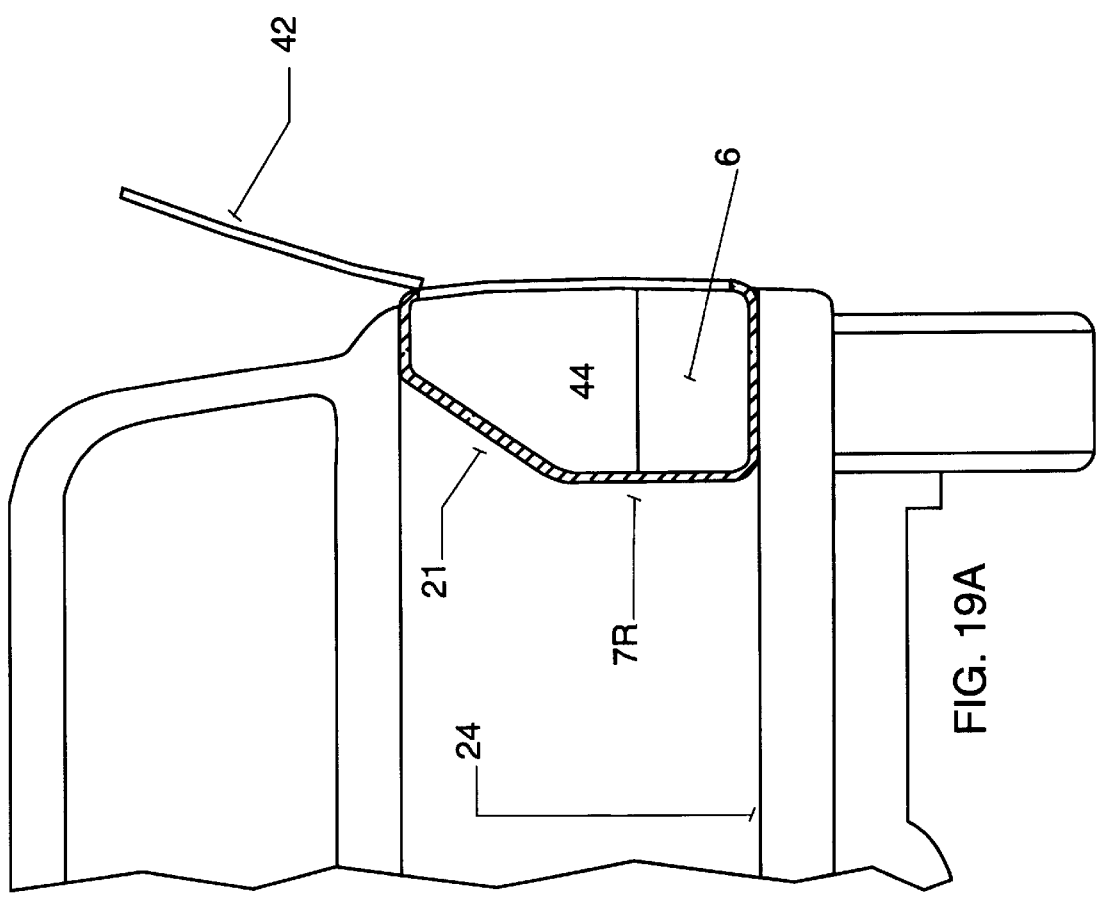
FIG. 19A shows a cross sectional view showing a storage container with the rearward outside door opened upward.
Figure 19B:
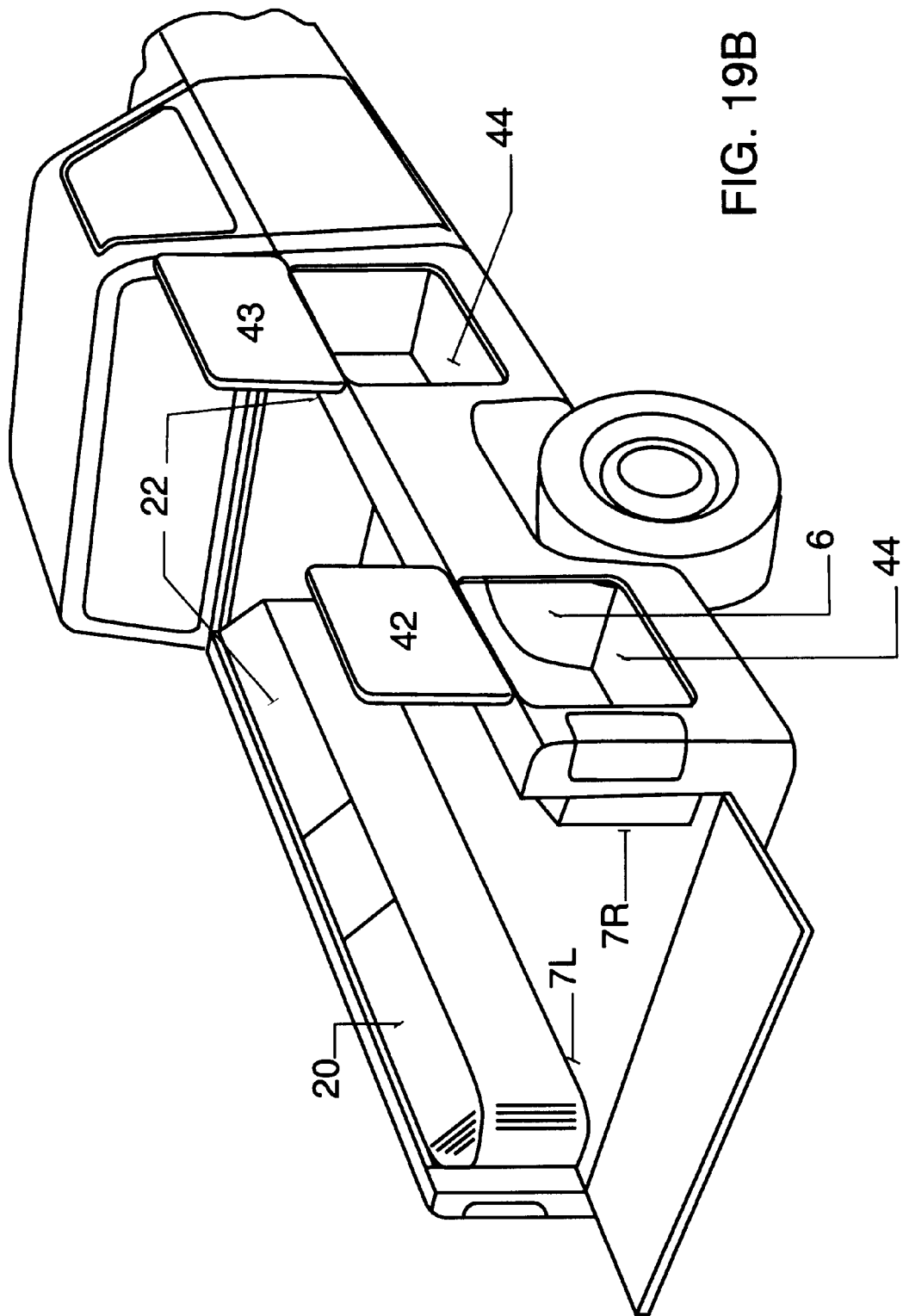
FIG. 19B shows outside access doors open.

An end view of the pickup bed showing storage container 7R with the rearward outside door 42 opened upward, and storage space 44 with a bottom level with pickup bed 24, is illustrated in FIG. 19A. Interior door or lid 21 is shown closed with fender well 6 visible from this view. FIG. 19B shows outside access doors 42 and 43 open revealing interior space 44 visible on each end of wheel well 6. All the variations of outside access doors can be hinged, locked, and sealed in many existing ways familiar to those experienced in the field. The advantages of the outside access shown is only significant when combined with the invention to provide the considerable storage space provided in all variations. Full outside access as shown in preceding FIG. 19, FIG. 19A, and 19.B, and the following FIG. 20, FIG. 20A, and FIG. 20B, is only possible with extensive pickup bed modification or redesign.

Figure 20:
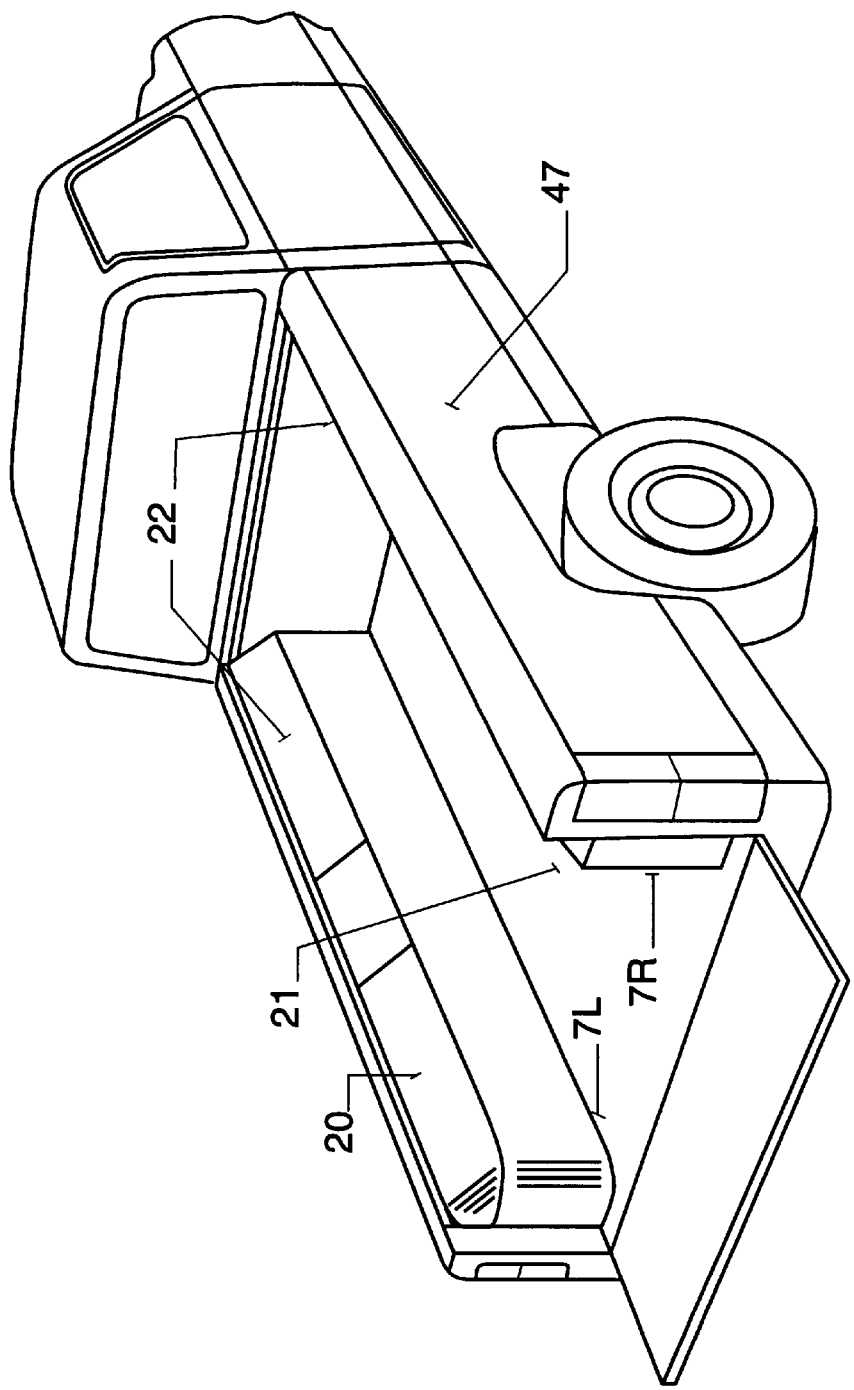
FIG. 20 shows a variation of the access shown in FIG. 19B.

FIG. 20 illustrates a variation on outside access to the full length side storage container where the entire upper portion of the pickup bed outside sheet metal is utilized to create full length door 47. The outside doors as described in FIG. 19 and FIG. 20 could augment any combination of the interior doors or lids previously described, as shown with lids or doors 20, 21, and 22, or could be the sole access to the side containers which could be either removable or a permanent part of a modified or redesigned pickup bed in this variation. FIG. 20A shows a storage container 7R, with full length outside door 47, and storage space 45 with a bottom portion that extends below the level pickup bed 24 outboard of the right frame rail 46 providing additional storage space 49. A solid angled top 48 is shown as an example of a side storage container with outside access only. Storage space 45 created by combining with downwardly extended storage space 49 are shown as an option but are not required with this variation of the invention. FIG. 20B shows a full length outside door 47 opened thereby revealing full length storage space 45 that is augmented by downwardly extended space 49. A solid storage container top 48 is shown, but any of the previously described top lid or door variations could be utilized equally as well. There has been outside storage doors on pickups before. Ford had an optional outside storage doors available that used space 49 in the nineteen sixties and seventies, for example. These storage doors and the compartments they accessed were in the space below and outside of the unchanged pickup bed interior.

Figure 20A:
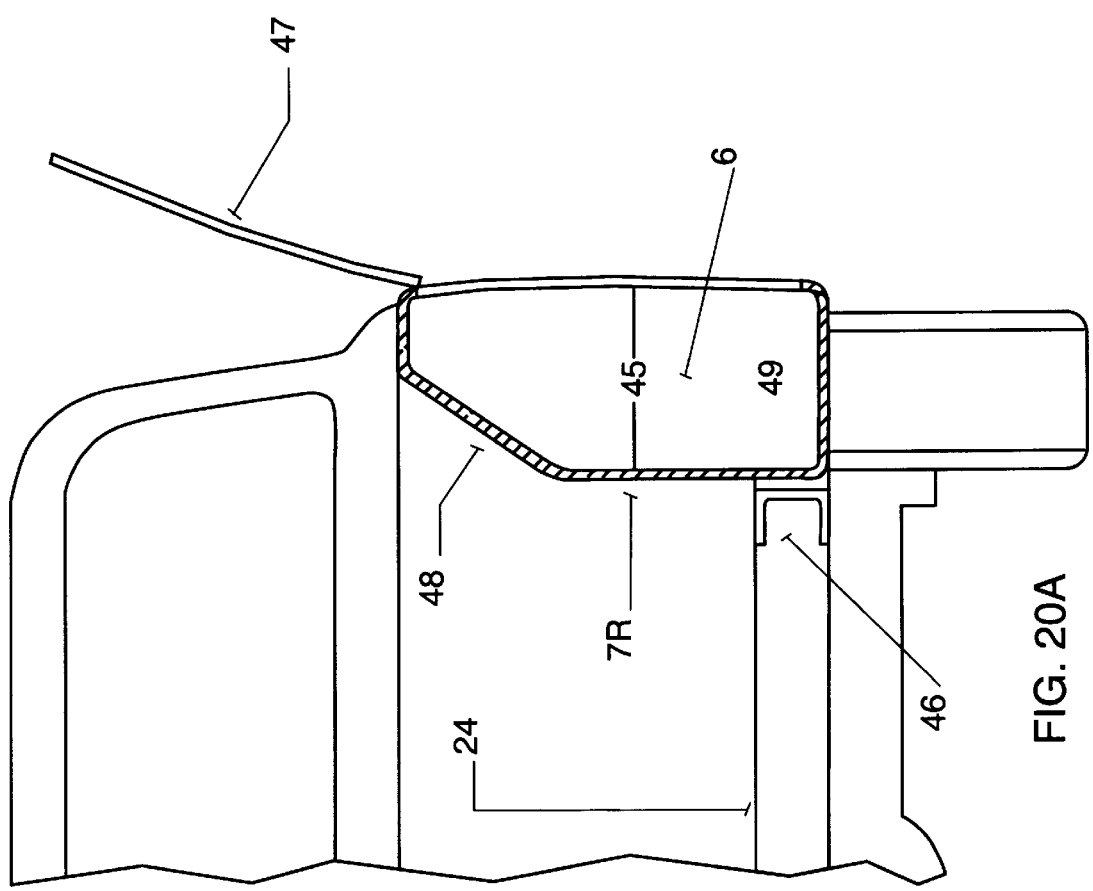
FIG. 20A is a cross sectional view of the pickup bed showing a storage container providing additional storage.
Figure 20B:
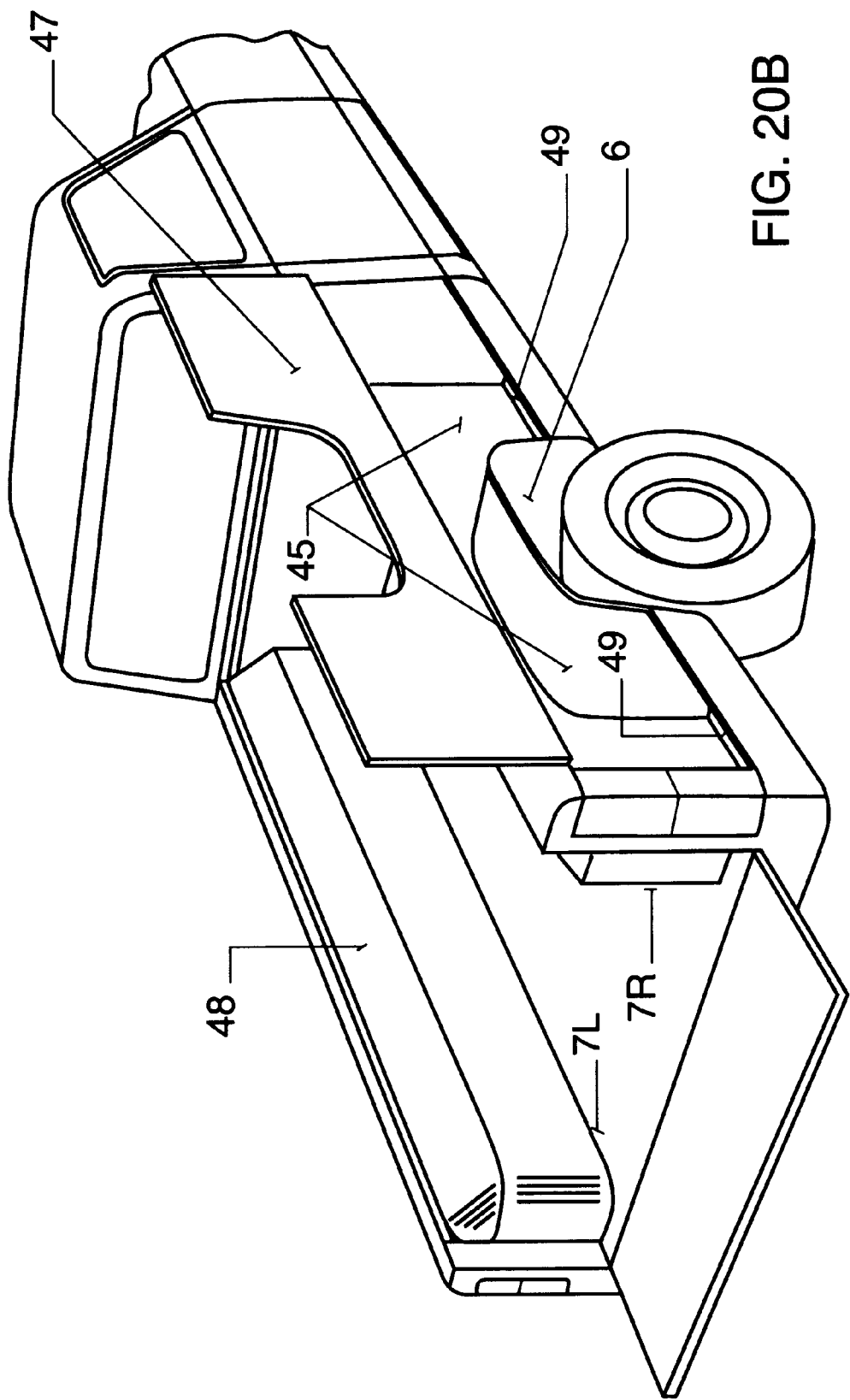
FIG. 20B shows an open outside door open revealing full length storage space.

The invention, as described in FIG. 20, FIG. 20A, and FIG. 20B, has the option of utilizing this space much more effectively by combining it with the storage space provided by the side storage containers. Modifying or redesigning the pickup bed to make space 49 available adds this storage space to the already considerable volume afforded by the invention whether the access to this space is exclusively from the outside or inside, or both.

Figure 21:
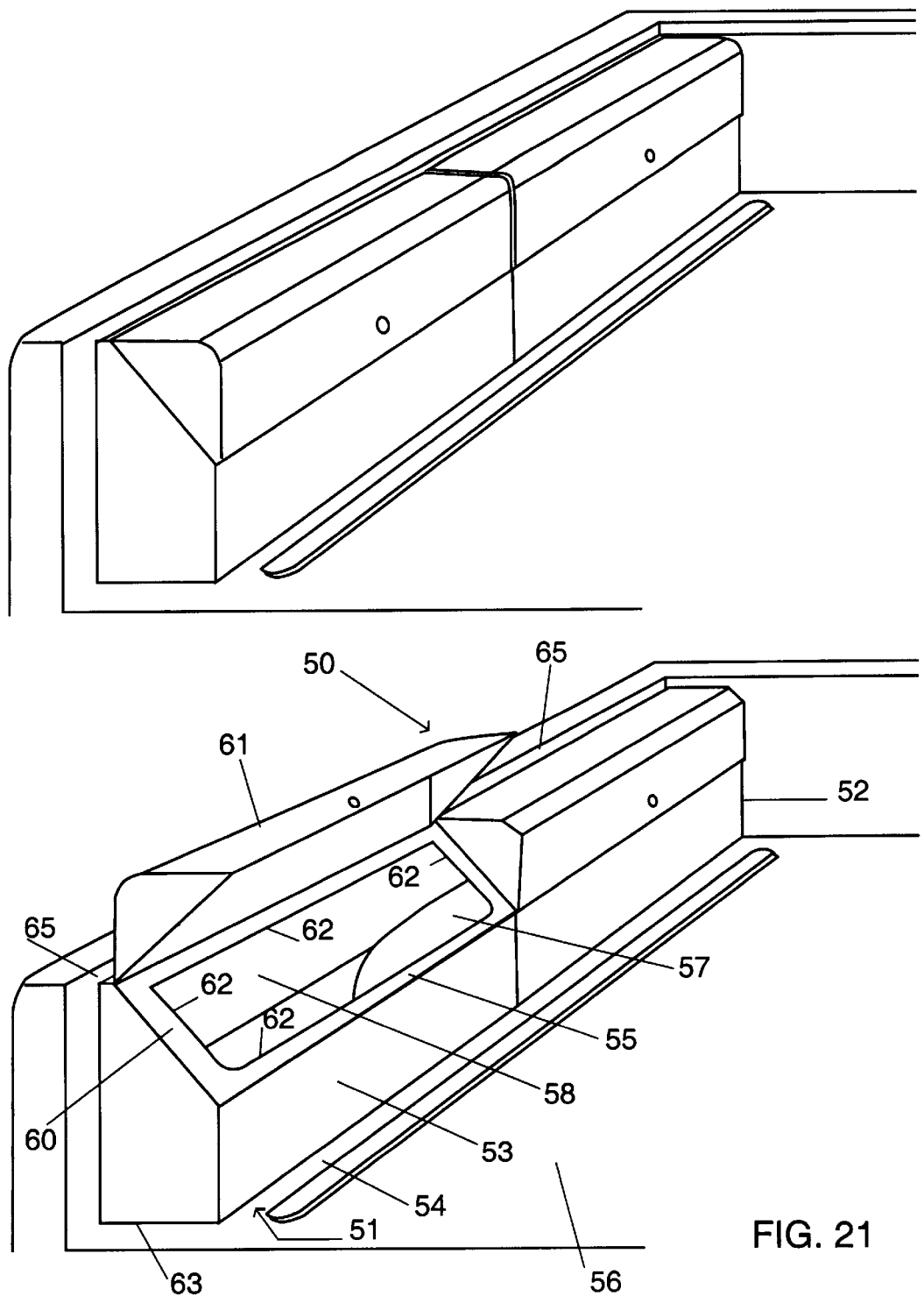
FIG. 21 shows a storage container having two similar sections.
Figure 22:
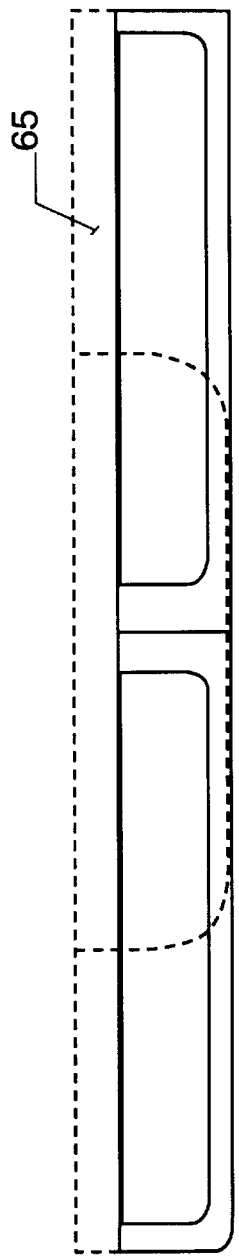
FIG. 22 shows a top view of the container of FIG. 21
Figure 24:
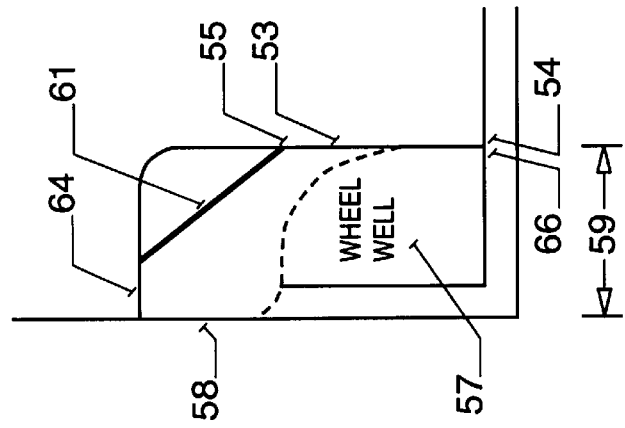
FIG. 24 shows a left side elevation view of a section of the container of FIG. 21.
Figure 23:
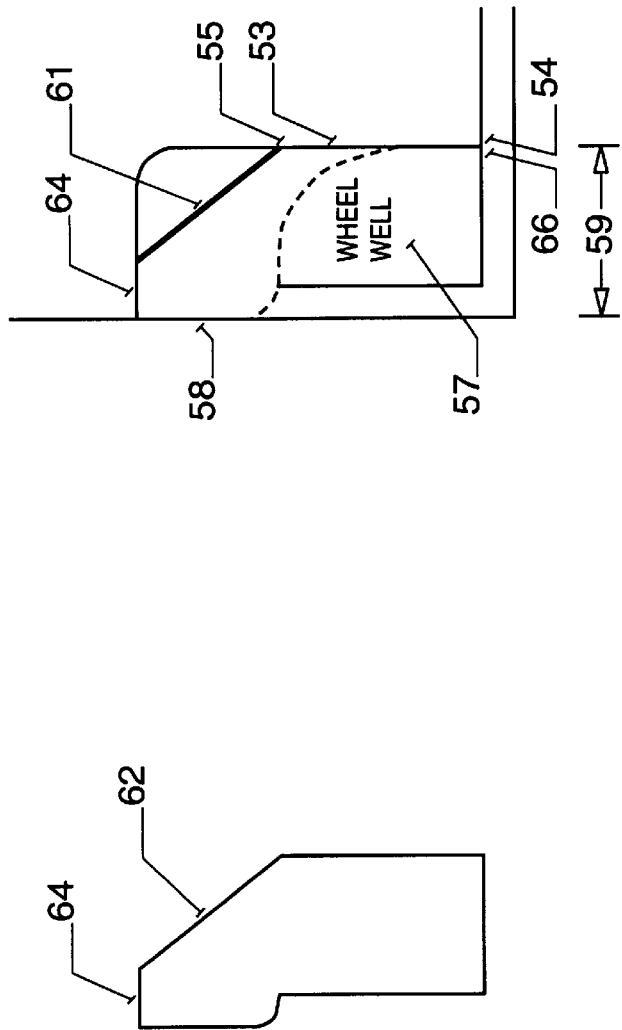
FIG. 23 shows a right side elevation view of a section of the container of FIG. 21.

The embodiment of FIG. 21 shows a storage container comprising two similar and independent sections 51 and 52. The sections are in the form of a shell or "skin" that when installed over the wheel well of a truck, typically a pick-up truck, covers or surrounds the area from the tail gate of the truck forward up to about midway of the wheel well, with the second section covering the remainder of the wheel well and the area forward therefrom to the truck cab. As will be described later in detail the sections 51 and 52 are sized and shaped to be nested, that is one section contained within another for ease of packaging, transport and storage. Since each section is substantially identical only a single die or mold is required to produce a complete container.

The section 51 includes a front wall 53 having a lower longitudinal edge 54 and an upper longitudinal edge 55. The edge 54 is configured to rest on the truck bed 56 and extends forward to a location about midway of the wheel well 57. When the section is installed, the edge 54 extends inwardly away from the truck side wall 58 a distance 59 (see FIG. 25) which is sufficiently dimensioned to provide a container interior area sufficient to accommodate storage of selected equipment and materials. A section top 60 extends from the upper edge 55 to the truck side wall 58. The top 60 also includes an opening defined by border 62 which is covered by cover 61 and which provides access to the interior of the container when the cover is in the open position.

The section 51 further includes an end wall 63 which depends downwardly from the top 60 and is sized to extend from the truck side wall 58 to the front wall 53. In doing so the end wall 63 forms a closed end of section 51. The top 60 includes a flat surface 64 that projects rearward from a location adjacent the axis of rotation of the cover (see FIG. 21) and is sized to fit closely under the truck side wall rail 65. A bend 66 extends from the lower longitudinal edge 54 inwardly towards the truck side walls and is oriented to contact the truck bed when the section is installed. For securing section 51 in place, the section is placed against the truck side wall such that surface 64 is positioned under rail 65 and a fastener, such as a metal screw or nut and bolt arrangement for example, is inserted through the bend 66 and truck bed and tightened to anchor the sections 51 and 52 to the truck. Obviously other anchoring techniques known in the art may be used for anchoring purposes.

In accordance with the above description it is noted that the section 51 is in the form of a shell having only one front wall, one end wall and a top having a corresponding top cover. Thus the section 51 has a closed end, an open end, a front wall and a top, with the truck bed upon which the section is anchored forming, in a sense, a bottom platform and the truck side walls forming, in a sense, a rear wall of the section, respectively. Section 52 has a structure complementary to that of section 51 such that when the sections are installed, the open ends abut to each other thereby forming a large interior container area extending essentially along the truck bed between the truck tail gate and truck cab and extending upward between the truck bed and the top 60.

Since the sections 51 and 52 are in the form of the shell described, they may be stacked or nested one upon the other with other sections as well, to facilitate and accommodate storage and shipping thereby reducing the costs therefor.

Although the foregoing description of the preferred embodiments of the present invention has shown, described and pointed out the fundamental novel features of the invention, it will be understood that various omissions, substitutions and changes in the form of the detail of the apparatus as illustrated as well as the uses thereof, may be made by those skilled in the art, without departing from the spirit of the present invention. Consequently, the scope of the invention should not be limited to the foregoing discussion, but should be defined by the appended claims.

What is claimed is:

1. A storage container for a pickup truck having a bed, spaced apart side walls upstanding from the truck bed, and a wheel well between the side walls, said container extending over and covering the wheel well and at least a portion of an area of the truck bed, said container comprising:

a vertical back wall for placement adjacent one of the truck side walls, a vertical front wall spaced apart from said back wall and having an upper end, a horizontal top wall having a first end connected to said back wall and a second end extending toward said front wall, and an opening for accessing an area between said front and back walls, said opening having a width measured from said second end of said top wall to the upper end of said front wall, said width being greater than the distance from said second end of said top wall to the vertical plane of said front wall, said opening being in a plane at an angle to the vertical plane of said front wall, and a raised portion having a configuration to fit behind an inward edge of a rail of the side walls of the pickup truck for securing the storage container to the pickup truck.

2. The storage container of claim 1 further comprising a moveable cover for covering said opening.

3. The storage container of claim 1 further comprising an end wall.

4. The storage container of claim 3 in which said end wall is removably coupled to said container.

5. The storage container of claim 3 further comprising a second opening in said end wall.

6. The storage container of claim 5 further comprising a removable cover for covering said second opening.

7. The storage container of claim 3 further comprising a second opening in at least a portion of said end wall and said front wall.

8. A storage container for a pickup truck, the truck having a bed and spaced apart side walls upstanding from the truck bed, said container extending over and covering at least a portion of an area of the truck bed, said container comprising two separate half sections, each of said half sections comprising:

a hollow elongated shell having a front wall and a top wall, said front wall having upper and lower longitudinal edges, said lower longitudinal edge adapted for resting on the truck bed such that when said container is installed, said lower longitudinal edge is spaced apart from one of the side walls of the truck, said top wall being sized to extend from one of the side walls of the truck to said upper longitudinal edge; and means for securing each of said half sections to the truck bed.

9. The storage container of claim 8 further comprising an end wall sized to extend from the truck side wall to said front wall of said half section while depending downwardly from said top wall to the truck bed to form a closed end of said half section.

10. The storage container of claim 9 wherein said end wall is removably coupled to said container.

11. The storage container of claim 9 further comprising an opening in said end wall.

12. The storage container of claim 11 further comprising a removable cover for covering said opening.

13. The storage container of claim 9 further comprising an opening in at least a portion of said end wall and said front wall.

14. The container of claim 13 further comprising a removable cover for covering said opening.

15. The storage container of claim 9 wherein said half sections are adapted to abut together along their ends to form a container disposed along a side wall of the truck.

16. The storage container of claim 8 wherein said securing means includes a bend extending from said lower longitudinal edge inwardly towards a side wall of the truck, said bend positioned to abut against the truck bed.

17. The storage container of claim 16 further comprising anchoring means for anchoring said bend to the truck bed.

18. The storage container of claim 8 further comprising an opening for providing access to the interior of the container when installed.

19. The container of claim 18 wherein said cover is attached by a hinge to said container.

20. The storage container of claim 8 further comprising a raised portion having a configuration to fit behind an inward edge of a rail of the side walls of the pickup truck for securing the storage container to the pickup truck.

21. A storage container for a truck, the truck having a bed and spaced apart side walls upstanding from the bed and terminating in a bed rail, said container having an upstanding inboard wall spaced apart from a side wall of the truck, said inboard wall having a height measured from the bed to an upper longitudinal edge thereof, at least one end wall disposed between the side wall of the truck and said inboard wall along the height thereof, the shortest distance between the side wall and said inboard wall defining a clearance distance, the height of said inboard wall dimensioned such that the shortest distance between the upper longitudinal edge of said inboard wall and the bed rail is greater than the clearance distance, and a raised portion having a configuration to fit behind an inward edge of a rail of the side walls of the pickup truck for securing the storage container to the pickup truck.

22. The container of claim 21 further comprising a removable container door rotatable between open and closed positions such that in the open position the shortest distance between the upper longitudinal edge of said inboard wall and the bed rail is greater than the clearance distance, and in the closed position, a distal edge of said door is in contact with the bed rail to thereby provide a closed container.

23. The container of claim 22 wherein said door is L-shaped such that when said door is in the closed position, said container has a rectangular cross-section.

24. The container of claim 21 further comprising an end wall door mounted on at least one end wall and rotatable about an axis between open and closed positions for allowing access to the container interior when in the open position and for sealing the container when in the closed position.

25. The container of claim 22 further comprising an end wall door mounted on an inboard wall and rotatable about an axis between open and closed positions for allowing access to the container interior when in the open position and for sealing the container when in the closed position.

26. A storage container for a truck, the truck having a bed and spaced apart side walls, each side wall having an upper extremity terminating in a bed rail, the bed rail having a downwardly projecting extension, said container comprising: a base, spaced apart inboard and outboard walls extending upwardly from said base defining respective heights thereof, said inboard wall having a height of a shorter dimension than that of said outboard wall, opposite facing end walls disposed between said inboard and outboard walls along the heights thereof, a top located at the upper extremity of said outboard wall, said top having a portion configured to conform in shape to the bed rail such that said top nestles into the bed rail as said container is installed into position such that said outboard wall lies adjacent to the truck side wall, said base rests upon the bed and said container is secured into position by means of the nestling of said top and the bed rail.

27. The storage container of claim 8 wherein the bed rail has a downwardly projecting arm having an upturned distal edge forming a channel, said container further comprising a lid dimensioned to span the distance between said channel and said upper extremity of said inboard wall, said lid having a depending edge dimensioned to fit within said channel and to be held in place thereby such that when in place, said lid rests against said upper extremity of said inboard wall to thereby seal said container.

28. The container of claim 26 further comprising an end wall door mounted on at least one end wall and rotatable about an axis between open and closed positions for allowing access to the container interior when in the open position and for sealing the container when in the closed position.

29. The container of claim 26 further comprising an end wall door mounted on an inboard wall and rotatable about an axis between open and closed positions for allowing access to the container interior when in the open position and for sealing the container when in the closed position.

30. A storage container for a pickup truck having a bed, spaced apart side walls upstanding from the truck bed, and a wheel well between the side walls, said container extending over and covering the wheel well and at least a portion of an area of the truck bed, said container comprising:

a vertical back wall for placement adjacent one of the truck side walls, a vertical front wall spaced apart from said back wall and having an upper end, a horizontal top wall having a first end connected to said back wall and a second end extending toward said front wall, and an opening for accessing an area between said front and back walls, said opening having a width measured from said second end of said top wall to the upper end of said front wall, said width being greater than the distance from said second end of said top wall to the vertical plane of said front wall, said opening being in a plane at an angle to the vertical plane of said front wall, and an end wall removably coupled to said container.

31. The storage container of claim 30 further comprising a second opening in at least a portion of said end wall and said front wall.

32. A storage container for a truck, the truck having a bed and spaced apart side walls upstanding from the bed and terminating in a bed rail, said container having an upstanding inboard wall spaced apart from a side wall of the truck, said inboard wall having a height measured from the bed to an upper longitudinal edge thereof, at least one end wall disposed between the side wall of the truck and said inboard wall along the height thereof, the shortest distance between the side wall and said inboard wall defining a clearance distance, the height of said inboard wall dimensioned such that the shortest distance between the upper longitudinal edge of said inboard wall and the bed rail is greater than the clearance distance, and a removable container door rotatable between open and closed positions such that in the open position the shortest distance between the upper longitudinal edge of said inboard wall and the bed rail is greater than the clearance distance, and in the closed position, a distal edge of said door is in contact with the bed rail to thereby provide a closed container.

33. The container of claim 32 wherein said door is L-shaped such that when said door is in the closed position, said container has a rectangular cross-section.

34. The container of claim 32 further comprising an end wall door mounted on an inboard wall and rotatable about an axis between open and closed positions for allowing access to the container interior when in the open position and for sealing the container when in the closed position.

35. A storage container for a truck, the truck having a bed and spaced apart side walls upstanding from the bed and terminating in a bed rail, said container having an upstanding inboard wall spaced apart from a side wall of the truck, said inboard wall having a height measured from the bed to an upper longitudinal edge thereof, at least one end wall disposed between the side wall of the truck and said inboard wall along the height thereof, the shortest distance between the side wall and said inboard wall defining a clearance distance, the height of said inboard wall dimensioned such that the shortest distance between the upper longitudinal edge of said inboard wall and the bed rail is greater than the clearance distance, and an end wall door mounted on at least one end wall and rotatable about an axis between open and closed positions for allowing access to the container interior when in the open position and for sealing the container when in the closed position.

* * * * *